United States Patent
Takeuchi

(10) Patent No.: US 10,809,054 B2
(45) Date of Patent: Oct. 20, 2020

(54) DEVICE, METHOD, AND PROGRAM FOR MEASURING SHAPE OF SPIRAL SPRING

(71) Applicant: CHUO HATSUJO KABUSHIKI KAISHA, Aichi (JP)

(72) Inventor: Hideyo Takeuchi, Aichi (JP)

(73) Assignee: Chuo Hatsujo Kabushiki Kaisha, Nagoya-Shi (JP)

( * ) Notice: Subject to any disclaimer, the term of this patent is extended or adjusted under 35 U.S.C. 154(b) by 131 days.

(21) Appl. No.: 16/083,573

(22) PCT Filed: Feb. 28, 2017

(86) PCT No.: PCT/JP2017/007967
§ 371 (c)(1),
(2) Date: Sep. 10, 2018

(87) PCT Pub. No.: WO2017/154682
PCT Pub. Date: Sep. 14, 2017

(65) Prior Publication Data
US 2019/0086196 A1    Mar. 21, 2019

(30) Foreign Application Priority Data
Mar. 11, 2016 (JP) .................. 2016-048994

(51) Int. Cl.
*G01B 11/24* (2006.01)
*G06T 7/00* (2017.01)
(Continued)

(52) U.S. Cl.
CPC .............. *G01B 11/24* (2013.01); *G01B 11/26* (2013.01); *G01B 21/20* (2013.01); *G06T 7/0006* (2013.01);
(Continued)

(58) Field of Classification Search
CPC ........ G01B 11/24; G01B 11/26; G01B 21/20; G06T 7/0006; G06T 7/13;
(Continued)

(56) References Cited

U.S. PATENT DOCUMENTS

2011/0214467 A1*  9/2011  Krueger ............... B21C 51/00
                                                              72/19.7

FOREIGN PATENT DOCUMENTS

CN  201903324 U  7/2011
CN  203011346 U  6/2013
(Continued)

OTHER PUBLICATIONS

International Search Report dated May 30, 2017 by the International Searching Authority for International Application No. PCT/JP2017/007967, filed on Feb. 28, 2017 and published as WO 2017/154682A1 on Sep. 14, 2017 (Applicant—Chuo Hatsujo Kabushiki Kaisha) (Original—3 pages// Translation—2 pages).
(Continued)

Primary Examiner — Nizar N Sivji
(74) Attorney, Agent, or Firm — Ballard Spahr LLP

(57) ABSTRACT

Provided is a shape measurement device that measures a shape of a spiral spring formed in a spiral shape. The shape measurement device is provided with an input means and a function calculation means. The input means inputs a captured photographic image depicting the spiral spring or measurement data produced by measuring the shape of the spiral spring. The function calculation means uses the input photographic image or measurement data to calculate at least an inter-coil space function representing the space between neighboring coils of the spiral spring, a pitch function representing the distance between coil cores of
(Continued)

neighboring coils of the spiral spring, or a coil thickness function representing the thickness of coils of the spiral spring.

9 Claims, 23 Drawing Sheets

(51) Int. Cl.
 *G06T 7/13* (2017.01)
 *G01B 21/20* (2006.01)
 *G01B 11/26* (2006.01)
(52) U.S. Cl.
 CPC ...... *G06T 7/13* (2017.01); *G06T 2207/10028* (2013.01); *G06T 2207/20056* (2013.01); *G06T 2207/30164* (2013.01)
(58) Field of Classification Search
 CPC . G06T 2207/30164; G06T 2207/20056; G06T 2207/10028
 See application file for complete search history.

(56) References Cited

FOREIGN PATENT DOCUMENTS

| CN | 103983197 A | 8/2014 |
|---|---|---|
| JP | 62-80505 A | 4/1987 |
| JP | 6-3118 A | 1/1994 |
| JP | 2013-019845 A | 1/2013 |
| JP | 2013019845 A | 1/2013 |
| JP | 2013190685 A | 9/2013 |
| JP | 2014-145626 A | 8/2014 |
| JP | 2014145626 A | 8/2014 |
| JP | 2015215427 A * | 12/2015 |
| JP | 6280505 B2 | 2/2018 |
| WO | WO 2017/154682 A1 | 9/2017 |

OTHER PUBLICATIONS

Written Opinion dated May 30, 2017 by the International Searching Authority for International Application No. PCT/JP2017/007967, filed on Feb. 28, 2017 and published as WO 2017/154682A1 on Sep. 14, 2017 (Applicant—Chuo Hatsujo Kabushiki Kaisha) (Original—3 pages).

Office Action dated Dec. 30, 2019 by the Chinese Patent Office for Application No. CN201780016200 , filed on Sep. 10, 2018 and published as CN109196302A on Jan. 11, 2019 (Applicant—Chug Hatsujo Kabushiki Kaisha) (Original—3 Pages // Translation—4 Pages ).

Office Action dated May 6, 2020 by the Chinese Patent Office for Application No. CN201780016200 , filed on Sep. 10, 2018 and published as CN109196302A on Jan. 11, 2019 (Applicant—Chug Hatsujo Kabushiki Kaisha) (Original—10 Pages // Translation—12 Pages ).

First search report dated Dec. 6, 2019 by the Chinese Patent Office for Application No. CN201780016200 , filed on Sep. 10, 2018 and published as CN109196302A on Jan. 11, 2019 (Applicant—Chug Hatsujo Kabushiki Kaisha) (2 Pages ).

Supplementary search report dated Apr. 23, 2020 by the Chinese Patent Office for Application No. CN201780016200 , filed on Sep. 10, 2018 and published as CN109196302A on Jan. 11, 2019 (Applicant—Chug Hatsujo Kabushiki Kaisha) (2 Pages ).

* cited by examiner

DEVICE, METHOD, AND PROGRAM FOR MEASURING SHAPE OF SPIRAL SPRING

CROSS-REFERENCE TO RELATED APPLICATION

This application is a U.S. National Phase Application of International Application No. PCT/JP2017/007967, filed Feb. 28, 2017, which claims priority to Japanese Application No. 2016-048994, filed Mar. 11, 2016, each of which are hereby incorporated by reference in their entirety.

TECHNICAL FIELD

The present disclosure claims the priority to Japanese Patent Application No. 2016-48994 filed on Mar. 11, 2016, the entire contents of which are incorporated by reference into the present description. The technology disclosed in the present description relates to a device, a method, and a program for measuring a shape of a spiral spring. The spiral spring herein refers to a spring that is formed in a spiral shape from a front end (inner hook) of an inner peripheral side to a front end (outer hook) of an outer peripheral side, when being viewed from above.

BACKGROUND ART

In procedures for quality inspection of industrial products such as spiral springs, a difference between a shape of the product and a shape specified in a design drawing is checked, and whether the product is formed according to the design drawing is checked. A product whose deviation from the shape specified in the design drawing is an allowable error is determined as a good product (qualified product), and a product whose deviation from the shape specified in the design drawing exceeds the allowable error is determined as a defective product (unqualified product) and discarded. In a procedure for quality inspection of the spiral spring, a shape of specific parts (locations) of the spiral spring (for example, a length of the inner hook, a length of the outer hook, a inner diameter and a free angle) is measured, and differences between the shape of these specific parts and the shape specified in the design drawing are checked (for example, Japanese Patent Application Laid-Open No. 2009-257950).

SUMMARY

Problem to be Solved by the Present Disclosure

With this check method, in fact, even a spiral spring that does not satisfy required performances also may be determined as a good product. That is, there exists a following problem: even in a situation that a coil (spring steel wire) of a spiral spring does not satisfy required performances due to deformation and so on, if a shape of a specific part meets determination criteria for a good product, the spiral spring also may be determined as a good product. The present description discloses a technology capable of appropriately measuring a shape of a spiral spring, so as to appropriately carry out quality inspection for the spiral spring.

Means for Solving the Problem

The present description discloses a shape measurement device for measuring a shape of a spiral spring formed in a spiral shape. The shape measurement device is provided with an input means and a function calculation means. The input means inputs a captured photographic image depicting the spiral spring or measurement data produced by measuring the shape of the spiral spring. The function calculation means calculates at least one of an inter-coil space function, a pitch function and a coil thickness function using the input photographic image or measurement data, wherein the inter-coil space function represents a space between neighboring coils of the spiral spring, the pitch function represents a distance between coil cores of neighboring coils (wires) of the spiral spring, and the coil thickness function represents thickness of coil of the spiral spring.

In the shape measurement device, the function calculation means calculates at least one of the inter-coil space function, the pitch function and the coil thickness function. Thus, at least one of the space between neighboring coils of the spiral spring, the distance between coil cores of neighboring coils of the spiral spring, and the thickness of the coil of the spiral spring that are not checked in the past can be checked. Therefore, the shape of the spiral spring can be appropriately measured, and as a result, quality inspection for the spiral spring can be appropriately carried out.

Besides, the present description discloses a new shape measurement method for measuring a shape of a spiral spring formed in a spiral shape. The shape measurement method performs an acquisition processing and a function calculation processing in a computer. In the acquisition processing, a photographic image depicting the spiral spring or measurement data produced by measuring the shape of the spiral spring is acquired. In the function calculation processing, at least one of an inter-coil space function, a pitch function and a coil thickness function is calculated using the acquired photographic image or measurement data, wherein the inter-coil space function represents a space between neighboring coils of the spiral spring, the pitch function represents a distance between coil cores of neighboring coils of the spiral spring, and the coil thickness function represents the thickness of the coil of the spiral spring.

According to this shape measurement method, the shape of the spiral spring can be appropriately measured, as a result, quality inspection for the spiral spring can be appropriately carried out.

Furthermore, the present description discloses a new program for measuring a shape of a spiral spring formed in a spiral shape. The program performs acquisition processing and function calculation processing in a computer. In the acquisition processing, a photographic image obtained by capturing the spiral spring or measurement data produced by measuring the shape of the spiral spring is acquired. In the function calculation processing, at least one of an inter-coil space function, a pitch function and a coil thickness function is calculated using the acquired photographic image or measurement data, wherein the inter-coil space function represents a space between neighboring coils of the spiral spring, the pitch function represents a distance between coil cores of neighboring coils of the spiral spring, and the coil thickness function represents the thickness of coils of the spiral spring.

According to this program, the shape of the spiral spring can be appropriately measured using a computer, as a result, quality inspection for the spiral spring can be appropriately carried out.

DETAILED DESCRIPTION OF EMBODIMENTS

Figure 1:
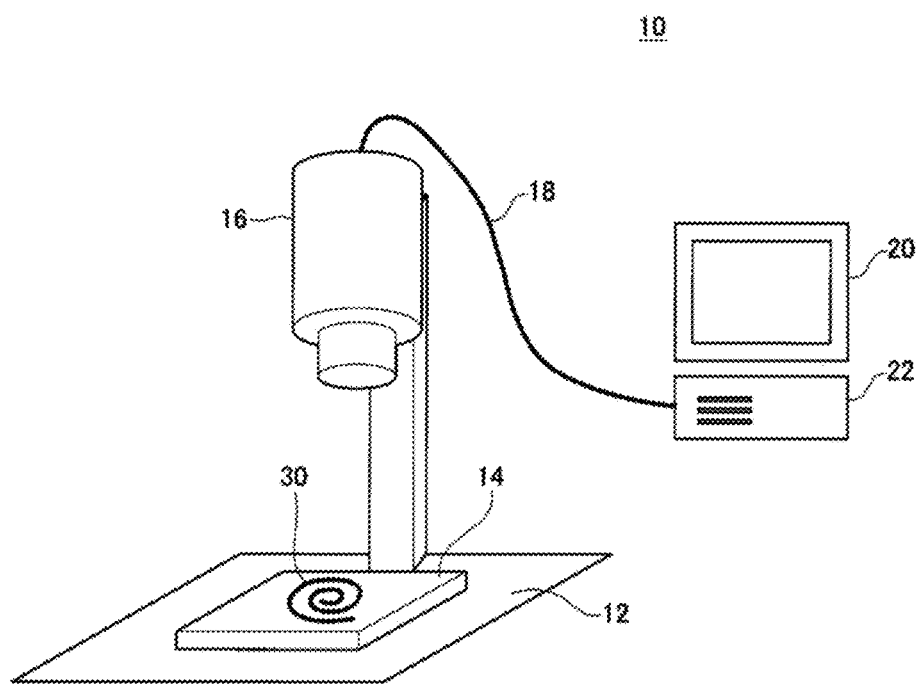
FIG. 1 is a figure showing a structure of a shape measurement device of First Example.

Below some technical features of examples disclosed in the present description are described. Besides, following items have independent technical practicability, respectively.

The shape measurement device disclosed in the present description also may be provided with: a storage unit, and at least one of an evaluation unit and a determination unit. The storage unit also may store at least one of a reference function and a reference parameter specified in advance. The evaluation unit also may quantitatively evaluate the shape of the spiral spring as a measurement object using at least one of the inter-coil space function, the pitch function and the coil thickness function calculated by the function calculation means, and at least one of the reference function and the reference parameter stored in the storage unit. The determination unit also may determine whether the spiral spring as the measurement object is good or not using at least one of the inter-coil space function, the pitch function and the coil thickness function calculated by the function calculation means, and at least one of the reference function and the reference parameter stored in the storage unit. According to this structure, the quality of the spiral spring can be quantitatively determined.

The shape measurement device disclosed in the present description may further be provided with an image conversion unit, wherein the image conversion unit is configured to create a polar-coordinate image obtained by performing polar-coordinate conversion on the input photographic image or the measurement data. The function calculation means also may calculate at least one of the inter-coil space function and the coil thickness function by tracking boundaries between the coil and background of the polar-coordinate image. According to this structure, even if noise of a certain degree is contained in the image, the boundaries between the coil and the background still can be correctly tracked. Besides, the inter-coil space function or the coil thickness function can be calculated within a relatively short period of time.

In the shape measurement device disclosed in the present description, the function calculation means also may calculate an outer edge function $e_o(\theta)$ by tracking a boundary of an outer side of the coil of the polar-coordinate image, calculate an inner edge function $e_i(\theta)$ by tracking a boundary of an inner side of the coil of the polar-coordinate image, and calculate at least one of the inter-coil space function and the coil thickness function on the basis of a difference between the outer edge function $e_o(\theta)$ and the inner edge function $e_i(\theta)$.

In the shape measurement device disclosed in the present description, when the boundary of the outer side and the boundary of the inner side of the coil of the polar-coordinate image are in contact, the function calculation means also may end the tracking in a location where the contact is. Besides, "the boundary of the outer side and the boundary of the inner side of the coil of the polar-coordinate image are in contact" means that neighboring coils of the spiral spring contact (adhere) with each other. According to the above structure, when there is a contact part between the boundaries of the outer side and the inner side of the coil, the function calculation means ends the tracking at the contact part, and no further tracking is performed. Therefore, the coils' contacting with each other can be detected within a short period of time, thus improving operation efficiency of the quality inspection.

The shape measurement device disclosed in the present description may further be provided with an image conversion unit, wherein the image conversion unit is configured to create a core-linearized image obtained by core-linearizing the input photographic image or measurement data. The function calculation means may further calculate at least one of the inter-coil space function and the pitch function on the basis of a distance between neighboring coil cores.

In the shape measurement device disclosed in the present description, the coil core (core line) also may be represented by a coordinate value set of pixels of the core-linearized image. The function calculation means also may calculate a distance between a first coil core and a second coil core on an outer peripheral side of the first coil core and neighboring the first coil core, using a first coordinate value contained in a coordinate value set constituting the first coil core and a second coordinate value at least closest to the first coordinate value, in a coordinate value set constituting the second coil core. According to this structure, the distance between neighboring coil cores can be correctly calculated.

The shape measurement device disclosed in the present description may further be provided with an image conversion unit, wherein the image conversion unit is configured to create an outline image obtained by extracting an outline from the input photographic image or measurement data in a state that no polar-coordinate conversion is performed. The function calculation means also may divide an outline of the outline image into an outer outline of an outer peripheral side and an inner outline of an inner peripheral side of the coil, and calculate at least one of the inter-coil space function and the coil thickness function on the basis of a distance between neighboring outer outline and inner outline.

In the shape measurement device disclosed in the present description, the outer outline and the inner outline of the coil also may be respectively represented by a coordinate value set of pixels of the outline image. The function calculation means also may calculate a distance between an outer outline and an inner outline on an outer peripheral side of the outer outline and neighboring the outer outline, using a third coordinate value contained in a coordinate value set constituting the outer outline and a fourth coordinate value at least closest to the third coordinate value, in a coordinate value set constituting the inner outline, and calculate the inter-coil space function on the basis of this distance. According to this structure, the distance between neighboring coils can be quantitatively calculated.

In the shape measurement device disclosed in the present description, the outer outline and the inner outline of the coil also may be respectively represented by a coordinate value set of pixels of the outline image. The function calculation means also may calculate a distance between an inner outline and an outer outline on an outer peripheral side of the inner outline and neighboring the inner outline, using a fifth coordinate value contained in a coordinate value set constituting the inner outline and a sixth coordinate value at least closest to the fifth coordinate value, in a coordinate value set constituting the outer outline, and calculate the coil thickness function on the basis of this distance. According to this structure, the thickness of the coil can be quantitatively calculated.

In the shape measurement device disclosed in the present description, the storage unit also may store at least one of a lower-limit threshold value function representing a lower limit value of the inter-coil space and an upper-limit threshold value function representing an upper limit value of the inter-coil space. When the inter-coil space function is lower than the lower-limit threshold value function or higher than the upper-limit threshold value function, the determination unit also may determine the spiral spring to be defective. According to this structure, by controlling the threshold value function stored in the storage unit, the inter-coil space of the spiral spring can be controlled to be in a desired shape, and the performance of the spiral spring can be improved.

FIRST EXAMPLE

A shape measurement device 10 of First Example is described with reference to the accompanying drawings. As shown in FIG. 1, the shape measurement device 10 is provided with a workbench 12, an illuminator 14 equipped on the workbench 12, a CCD camera 16 fixed on the workbench 12, a computer 22 connected to the CCD camera 16 via a communication line 18, and a display 20 connected to the computer 22.

The illuminator 14 is a surface light source, and a spiral spring 30 is carried on a light-emitting surface thereof. The CCD camera 16 is equipped above the illuminator 14, to photograph the spiral spring 30 carried on the illuminator 14. That is, the spiral spring 30 is illuminated by the illuminator 14 from below, and transmitted light (a shadow of the spiral spring 30) of the illuminator 14 is photographed by the CCD camera 16. Besides, the illuminator 14 is not limited to pass-through illumination as in the present example, but also can illuminate the spiral spring 30 from above. At this time, multiple illuminators or ring-shape illuminators are preferably used to uniformly illuminate the spiral spring 30 from the whole circumferential direction.

Image data photographed by the CCD camera 16 is input to the computer 22 via the communication line 18. In the computer 22, a program for executing following shape measurement processing is stored. The computer 22 processes the image data of the photographic image photographed by the CCD camera 16, and calculates an inter-coil space function representing a space between neighboring coils of the spiral spring 30. In a memory of the computer 22, a threshold value function specified in advance is stored. The computer 22 compares the calculated inter-coil space function with the threshold value function, so as to determine whether the spiral spring 30 is good or not, and display a determination result on the display 20.

FIG. 2A~FIG. 2D are flow charts showing the shape measurement flow performed for the spiral spring 30 using the shape measurement device 10. Through the procedures and processing shown in FIG. 2A~FIG. 2D, the shape measurement device 10 calculates the inter-coil space function of the spiral spring 30, and judges whether the spiral spring 30 is good or not. Below, the shape measurement flow performed for the spiral spring 30 using the shape measurement device 10 is described in accordance with the flow charts shown in FIG. 2A and FIG. 2B.

Figure 2A:
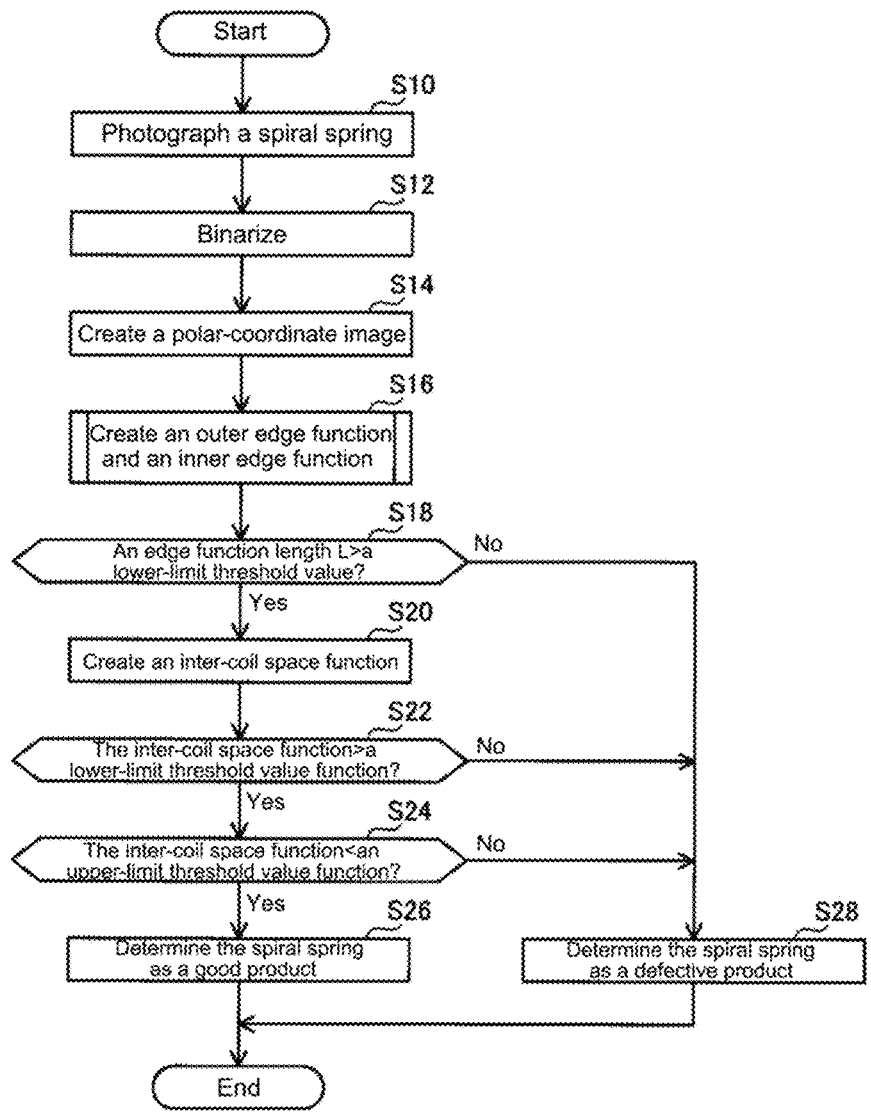
FIG. 2A is a flow chart (first portion) showing the shape measurement flow performed for a spiral spring using the shape measurement device of First Example.
Figure 3:
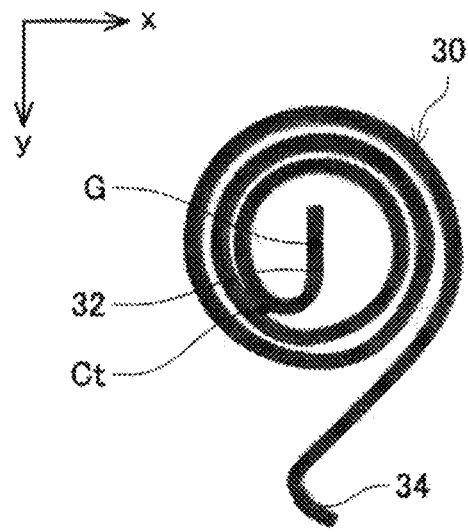
FIG. 3 is a figure showing a photographic image of the spiral spring (first type).
Figure 9:
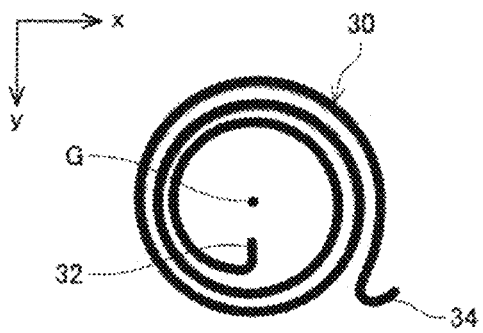
FIG. 9 is a figure showing a photographic image of the spiral spring (second type).

Firstly, in Step S10 of FIG. 2A, the spiral spring 30 is photographed by the CCD camera 16. The photographic image photographed by the CCD camera 16 is input to the computer 22. The input photographic image may for example be an image with a gray level of 256, in which a brightness value of a blackest pixel is "0", and a brightness value of a whitest pixel is "255". In FIG. 3 and FIG. 9, photographic images of two types of spiral spring 30 are illustrated. Each of the two types of spiral spring 30 shown in FIG. 3 and FIG. 9 extends in a spiral shape from an inner hook 32 to an outer hook 34. However, the two types of spiral spring 30 are significantly different in shapes of the inner hooks 32 thereof. That is, the inner hook 32 of the spiral spring 30 shown in FIG. 3 overlaps a center of gravity G of the respective spiral spring 30, but the inner hook 32 of the spiral spring 30 shown in FIG. 9 does not overlap a center of gravity G of the respective spiral spring 30. In the present description, the spiral spring 30 shown in FIG. 3 is referred to as a first type, and the spiral spring 30 shown in FIG. 9 is referred to as a second type. The shape measurement device 10 can measure shapes of spiral springs 30 of the first type and of the second type. Besides, particularly in cases where no distinctive description is provided, a common processing is performed for the first type and the second type. In addition, the photographic image is a brightness-value image where each of the pixels (x, y) has a brightness value.

Subsequently, in Step S12, the photographic image photographed in Step S10 is binarized. That is, for each pixel (x, y) of the input photographic image, when the brightness value is equal to or greater than a preset set value, it is set as a density value "0" (white pixel); when the brightness value is smaller than the preset set value, it is set as a density value "1" (black pixel). Thus, a pixel group of a part corresponding to the spiral spring 30 has the density value "1", while other pixel groups have the density value "0". Besides, processing from this Step S12 to subsequent Step S36 is executed by the computer 22.

Figure 4:
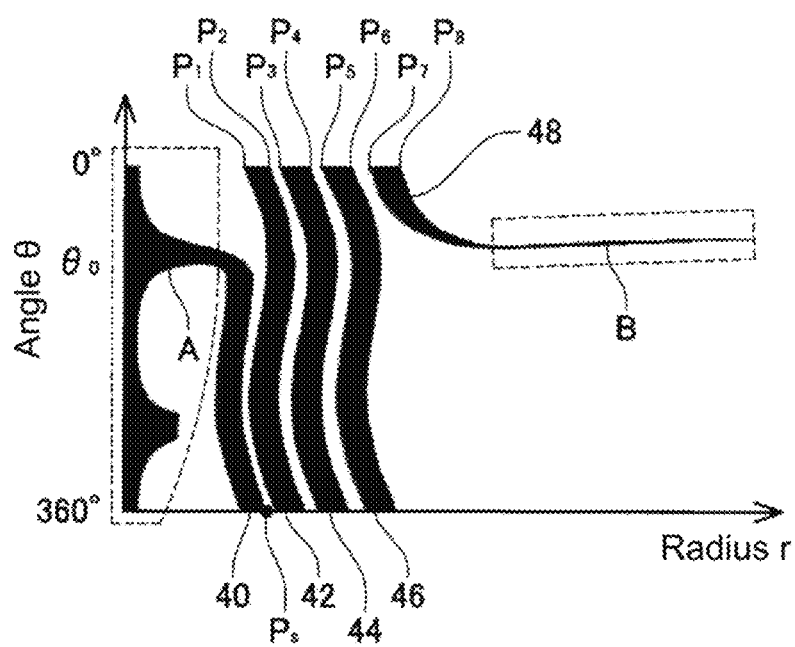
FIG. 4 is a figure showing a polar-coordinate image of a spiral spring of the first type.
Figure 10:
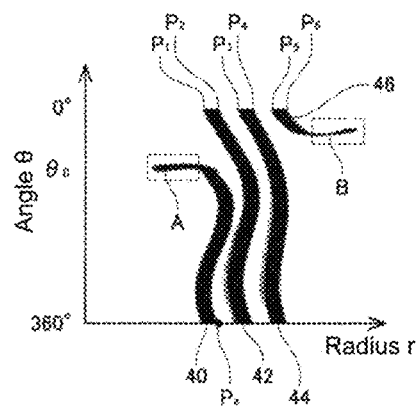
FIG. 10 is a figure showing a polar-coordinate image of a spiral spring of the second type.

Subsequently, in Step S14, polar-coordinate conversion is performed for the binarized image obtained in Step S12 so as to create a polar-coordinate image. FIG. 4 shows a polar-coordinate image of a spiral spring 30 of the first type (referring to FIG. 3). FIG. 10 shows a polar-coordinate image of a spiral spring 30 of the second type (referring to FIG. 9). The processing of creating the polar-coordinate image according to the binarized image can be performed using a commonly known method (for example, Japanese Patent Application Laid-Open No.2009-257950). Specifically, after the center of gravity G of the spiral spring 30 is obtained as an assumed center, the polar-coordinate image can be created using a commonly known conversion formula.

Subsequently, in Step S16, an outer edge function $e_o(\theta)$ and an inner edge function $e_i(\theta)$ are created on the basis of the polar-coordinate image created in Step S14. The processing for creating the outer/inner edge function is described with reference to FIG. 2B.

(The Processing for Creating the Outer/Inner Edge Function)

Figure 2B:
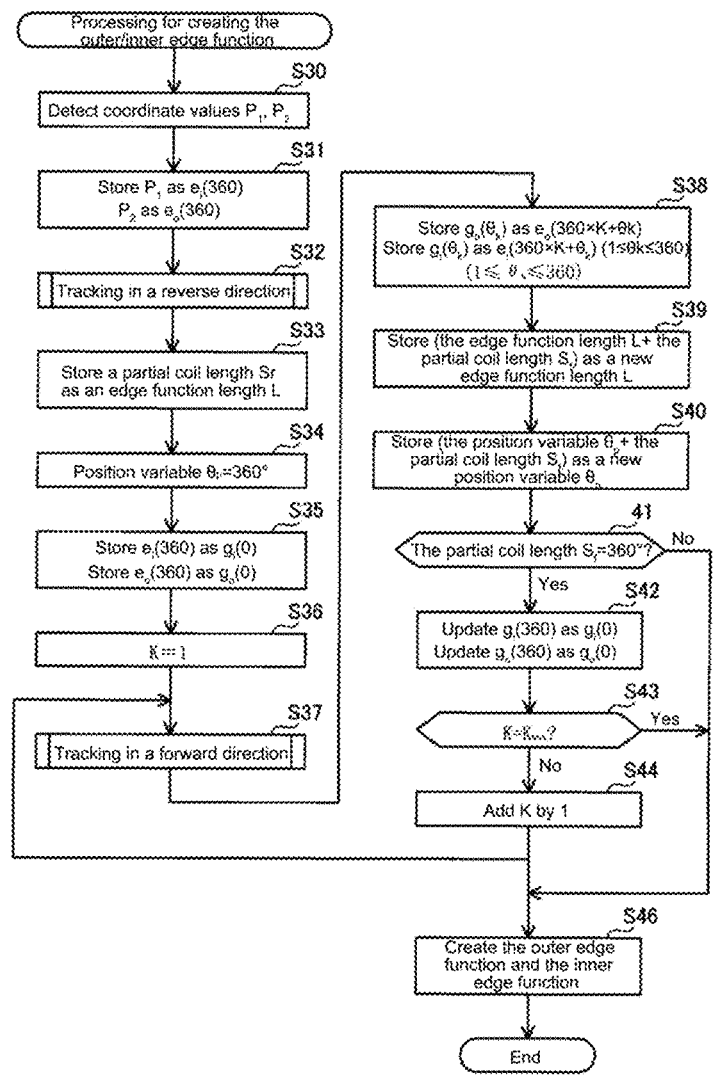
FIG. 2B is a flow chart (second portion) showing the shape measurement flow performed for the spiral spring using the shape measurement device of First Example.

As shown in FIG. 2B, in the processing, and in Step S30, coordinate values $P_1$, $P_2$ are detected using the polar-coordinate image. As shown in FIG. 4 and FIG. 10, the polar-coordinate image has a plurality of pixel groups in a stripe shape having a density value of 1. Below, for facilitating the description, these pixel groups in a stripe shape are endowed with reference signs for distinction. In the polar-coordinate image of the spiral spring 30 of the first type, as shown in FIG. 4, the pixel groups in a stripe shape are referred to as a pixel group 40, a pixel group 42, a pixel group 44, a pixel group 46, and a pixel group 48, respectively. In the polar-coordinate image of the spiral spring 30 of the second type, as shown in FIG. 10, the pixel groups in a stripe shape are referred to as a pixel group 40, a pixel group 42, a pixel group 44, and a pixel group 46, respectively. Besides, a pixel group equivalent to the portion of the inner hook 32 is named as a pixel group A, and a pixel group equivalent to the portion of the outer hook 34 is named as a pixel group B. In FIG. 4 and FIG. 10, in order to be distinguished from other pixel groups, areas containing the pixel groups A and B are denoted by broken lines. Within the broken lines, the pixel groups having the density value 1 are the pixel group A and the pixel group B, respectively. The pixel group A and the pixel group B can be determined using a commonly known method (for example, Japanese Patent Application Laid-Open No.2009-257950). Regardless of the type, an upper end of the pixel group 40 follows the pixel group A equivalent to the portion of the inner hook 32, and a lower end of the pixel group 48 (in the situation of the second type, a lower end of the pixel group 46) follows the pixel group B equivalent to the portion of the outer hook 34. Besides, a component $\theta$ of a coordinate value of a boundary of the pixel group 40 is in a range of 0°~360°. Below, the components $\delta$ of coordinate values of boundaries of respective pixel groups 42, 44, 46, 48 are in ranges of 360°~720°, 720°~1080°, 1080°~1440°, 1440°~1800°, respectively.

Specifically, the coordinate values $P_1$, $P_2$ are detected in a following manner. Firstly, on a line of the polar-coordinate image with $\theta$=360°, tracking is performed from left to right. Then, a coordinate value of a pixel with a density value of 0 is detected as $P_1$ when the density value of the pixel firstly changes from 0 to 1, and a coordinate value of a pixel with a density value of 1 is detected as $P_2$ when the density value of the pixel firstly changes from 1 to 0. The coordinate value $P_1$ represents a boundary of a left side of the pixel group 40, and the coordinate value $P_2$ represents a boundary of a right side of the pixel group 40. Below, the boundary of the left side of each of the pixel groups 40~48 is specifically referred to as "an inner edge", and the boundary of the right side is specifically referred to as "an outer edge". Besides, a component r of the coordinate value of the inner edge is referred to as $r_i$, and a component r of the coordinate value of the outer edge is referred to as $r_o$. That is, the component r of the coordinate value $P_1$ is $r_i$ when $\theta$=360°, and the component r of the coordinate value $P_2$ is $r_o$ when $\theta$=360°.

Subsequently, in Step S31, the component r of the coordinate value $P_1$, $r_i$, is stored as $e_i(360)$. Likewise, the component r of the coordinate value $P_2$, $r_o$, is stored as $e_o(360)$. They are stored in an RAM. Subsequently, in Step S32, boundaries of the left side and the right side of the pixel group 40 are tracked in a reverse direction. Herein, tracking in the reverse direction means tracking towards a direction where a value of a longitudinal axis $\theta$ of the polar-coordinate image decreases. The the tracking processing in the reverse direction is described with reference to FIG. 2C.

(Tracking Processing in the Reverse Direction)

In the processing, the tracking is performed from left to right in a specified range on respective lines with $\theta$=359°, 358° . . . 0°, such that the component r of the coordinate value of the pixel with the density value of 0 when the density value of the pixel firstly changes from 0 to 1 and the component r of the coordinate value of the pixel with the density value of 1 when the density value of the pixel firstly changes from 1 to 0 are detected. Below the density value of the pixel with the coordinate value ($\theta$, r) is expressed as D($\theta$, r). For example, when D($\theta_1$, $r_1$)=0, a pixel with the coordinate value ($\theta_1$, $r_1$) is a white pixel, and when D($\theta_2$, $r_2$)=1, a pixel with the coordinate value ($\theta_2$, $r_2$) is a black pixel.

Figure 2C:
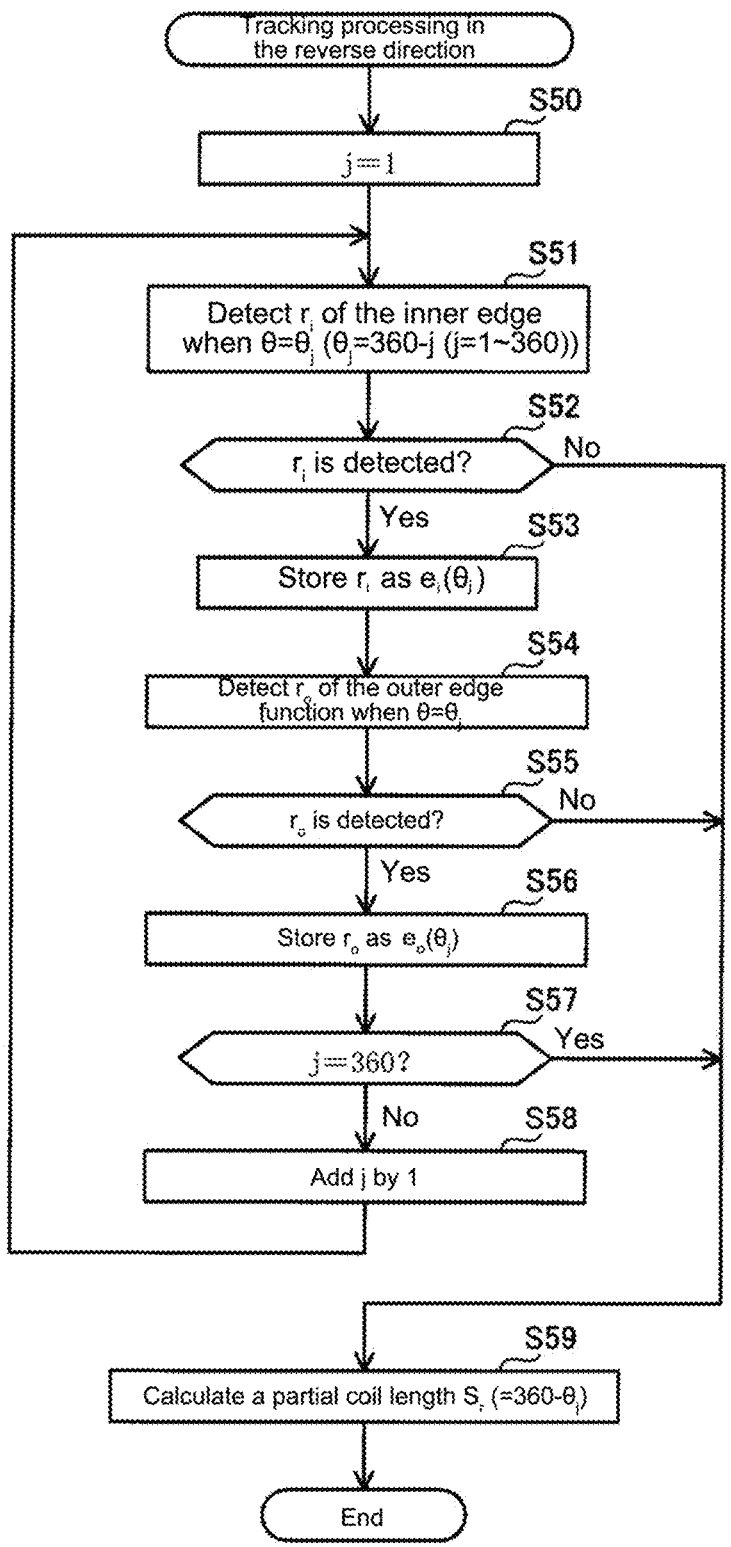
FIG. 2C is a flow chart (third portion) showing the shape measurement flow performed for the spiral spring using the shape measurement device of First Example.

The specific processing is described. As shown in FIG. 2C, firstly, in Step S50, it is set that j=1, and enter Step S51. In Step S51, the component r of the coordinate value of the inner edge of the pixel group 40, $r_i$, when $\theta=\theta_j$ ($\theta_j=360°-j$ (j=1°~360°)) is detected. The $r_i$ is defined with the following r, that is, the component r on a line with $\theta=\theta_j$ is in a range of $e_i(\theta_j+1)-\delta \le r \le e_i(\theta_j+1)+\delta$, and the r satisfies $D(\theta_j, r)=0$ and $D(\theta_j, r+1)=1$. For example, when j=1, on a line with $\theta_1=359°$, r which is in a range of $e_i(360)-\delta \le r \le e_i(360)+\delta$ and satisfies $D(\theta_1, r)=0$ and $D(\theta_1, r+1)=1$ is detected as n of the coordinate value of the inner edge with $\theta=\theta_1$. Herein, $e_i(360)$ is the component r of the coordinate value $P_1$ stored in Step S31. According to the processing, the detection of n of the coordinate value of the inner edge is merely carried out in a specified range on the line with $\theta=\theta_j$. Therefore, a processing speed can be improved.

Subsequently, in Step S52, whether n of the coordinate value of the inner edge is detected in Step S51 is judged. When there is an r satisfying the above condition, it is judged that n is successfully detected ("Yes" in Step S52), and it goes to Step S53. On the other hand, when there is no r satisfying the above condition, it is judged that n is unsuccessfully detected ("No" in Step S52), and it goes to Step S59 (to be described below). Besides, the situation of "No" in Step S52 refers to the following situation: within the range of the above r on the line with $\theta=\theta_j$, the density values of 2 neighboring pixels do not change from the white pixel to the black pixel in a direction of right. That is, specifically, it can be considered as the following situation: a portion of the coil equivalent to the pixel group 40 when $\theta=\theta_j$ contacts the inner hook 32, or contacts other portions of the coil, or has a shape out of the specification and so on.

In Step S53, the n detected in Step S51 is stored as $e_i(\theta_j)$. For example, when j=1, the n of the coordinate value of the inner edge when $\theta=359°$ is stored as $e_i(359)$. The $e_i(\theta_j)$ is stored in the RAM.

In Step S54, the component r of the coordinate value of the outer edge of the pixel group 40 when $\theta=\theta_j$, $r_o$, is detected. The $r_o$ is defined with the following r, that is, the component r on the line with $\theta=\theta_j$ is in a range of $e_o(\theta_j+1)-\delta \le r \le e_o(\theta_j+1)+\delta$, and the r satisfies $D(\theta_j,r)=1$ and $D(\theta_j,r+1)=0$. For example, when j=1, on a line with $\theta_1=359°$, r which is in a range of $e_o(360)-\delta \le r \le e_o(360)+\delta$ and satisfies $D(\theta_1, r)=1$ and $D(\theta_1, r+1)=0$ is detected as $r_o$ of the coordinate value of the outer edge with $\theta=\theta_1$. Herein, $e_o(360)$ is the component r of the coordinate value $P_2$ stored in Step S31. According to the processing, $r_o$ of the coordinate value of the outer edge is merely detected in a specified range on the line with $\theta=\theta_j$. Therefore, the processing speed can be improved.

Subsequently, in Step S55, whether $r_o$ of the coordinate value of the outer edge is detected in Step S54 is judged. When there is an r satisfying the above condition, it is judged that $r_o$ is successfully detected ("Yes" in Step S55), and it goes to Step S56. On the other hand, when there is no r satisfying the above condition, it is judged that $r_o$ is unsuccessfully detected ("No" in Step S55), and it goes to Step S59 (to be described below). Besides, the situation of "No" in Step S55 refers to the following situation: within the range of the above r on the line with $\theta=\theta_j$, the density values of 2 neighboring pixels do not change from the black pixel to the white pixel in the direction of right. That is, specifically, it can be considered as the following situation: a portion of the coil equivalent to the pixel group 40 when $\theta=\theta_j$ contacts other portions of the coil, or has a shape out of the specification and so on.

In Step S56, $r_o$ detected in Step S54 is stored as $e_o(\theta_j)$. For example, when j=1, $r_o$ of the coordinate value of the outer edge when $\theta=359°$ is stored as $e_o(359)$. The $e_o(\theta_j)$ is stored in the RAM.

Subsequently, in Step S57, it is judged whether j=360. When j is not equal to 360, it is judged "No" in Step S57, and it goes to Step S58. In Step S58, j is added by 1 and it returns back to Step S51, to repeat the processing until Step S57. The processing is repeated until it is judged "Yes" in Step S57 (that is, until it is judged j=360). Thus, the component r(s) of the coordinate values of the inner edge and the outer edge of the pixel group 40 when $\theta_j=360°-j$ (=359°, 358° ... 0°, $r_i$, $r_o$ (tracking in the reverse direction), are detected sequentially, and they can be stored as $e_i(\theta_j)$, $e_o(\theta_j)$ in the RAM. On the other hand, when j=360, it is judged "Yes" in Step S57, and it goes to Step S59 (to be described below). Besides, for the situation of "Yes" in Step S57, it refers to the following situation: the portion of the coil equivalent to the pixel group 40 is tracked in the reverse direction by the quantity of one turn.

It goes to Step S59 in a situation of "No" in Step S52, "No" in Step S55, and "Yes" in Step S57. In Step S59, a length of the pixel group 40 until which the tracking in the reverse direction is completed is calculated as a partial coil length $S_r$. Specifically, when it goes to Step S59 if it is judged "No" in Step S52 or "No" in Step S55, in Step S51 or step S54, $r_i$ or $r_o$ when $\theta=\theta_j$ is unsuccessfully detected. At this time, the length of the component $\theta$ from $\theta=360°$ to $\theta_j$, i.e $360°-\theta_j$, is calculated as the partial coil length $S_r$. Besides, when it goes to Step S59 if it is judged "Yes" in Step S57, the partial coil length $S_r$ is 360° (that is, the length of the quantity of one turn of the component $\theta$). If the processing in Step S59 is ended, the tracking in the reverse direction is ended. Besides, in the above processing, a r satisfying $D(\theta_1, r)=0$ and $D(\theta_1, r+1)=1$ in a specified range is detected as $r_i$ of the inner edge, but a conditional expression is not limited to the above conditional expression. For example, a r satisfying all of the conditional expressions $D(\theta_1, r-2)=0$, $D(\theta_1, r-1)=0$, $D(\theta_1, r)=0$, $D(\theta_1, r+1)=1$, $D(\theta_1, r+2)=1$, $D(\theta_1, r+3)=1$ can be detected as $r_i$ of the inner edge. That is, after 3 consecutive pixels from left to right are all white pixels with such the density value of the pixel, the component r of the coordinate value of the white pixel on a rightmost side is detected as $r_i$ when 3 consecutive pixels are all black pixels. According to the detection condition, it can prevent a sudden noise from being erroneously detected as the inner edge, and the detection precision of $r_i$ can be further improved. The detection condition is also applicable to the detection of the outer edge $r_o$. Besides, it is also applicable to subsequent tracking in a forward direction.

Return back to FIG. 2B to continue with the description. If the tracking in the reverse direction is ended in Step S32, it goes to Step S33. In Step S33, the partial coil length $S_r$ calculated from the tracking processing in the reverse direction in Step S32 is stored as an edge function length L. That is, if $e_i(\theta_j)$ stored upon the processing of Steps S31 and S32 are connected by a coordinate system $\theta-r$ for performing approximation, a function representing the inner edge of the pixel group 40 (inner edge function) can be created. Likewise, if $e_o(\theta_j)$ are connected by the coordinate system $\theta-r$ for performing approximation, a function representing the outer edge of the pixel group 40 (outer edge function) can be created. Therefore, the partial coil length $S_r$ represents the length of the inner edge function and outer edge function of the pixel group 40. Therefore, in Step S33, the partial coil length $S_r$ is stored as an edge function length L. The edge function length L is stored in the RAM.

Subsequently, in Step S34, a position variable $\theta_p$ is set as 360°, and it goes to Step S35. In Step S35, $e_i(360)$ is stored as $g_i(0)$, and $e_o(360)$ is stored as $g_o(0)$. Herein, $g_i(0)$ is the component r of the coordinate value of the inner edge of the pixel group 42 when $\theta=0°$, $r_i$, and $g_o(0)$ is the component r of the coordinate value of the outer edge of the pixel group 42 when $\theta=0°$, $r_o$. The portion of the spiral spring 30 equivalent to the pixel group 40 follows the portion of the spiral spring equivalent to the pixel group 42. Therefore, the inner edge $r_i$ and the outer edge $r_o$ of the pixel group 40 when $\theta=360°$ are respectively equal to the inner edge $r_i$ and the outer edge $r_o$ of the pixel group 42 when $\theta=0°$. That is, in the processing of Step S35, $r_i$ and $r_o$ of the pixel group 42 are calculated using $r_i$ and $r_o$ of the pixel group 40, and they are respectively stored as $g_i(0)$, $g_o(0)$. According to the processing, for pixel groups other than the pixel group 40, the processing as in Step S30 is not needed, therefore, the processing efficiency can be improved.

Subsequently, in Step S36, K is set as 1, and it goes to Step S37. In Step S37, the inner edge and the outer edge of the pixel group 42 are tracked in the forward direction. Herein, tracking in the forward direction means tracking towards a direction where the value of the longitudinal axis $\theta$ of the polar-coordinate image increases. For the processing of tracking in the forward direction, apart from the tracking direction being the direction where $\theta$ increases, the processing is the same as the tracking processing in the reverse direction. Therefore, for the same processing as the tracking processing in the reverse direction, detailed description is omitted.

(Tracking Processing in the Forward Direction)

Figure 2D:
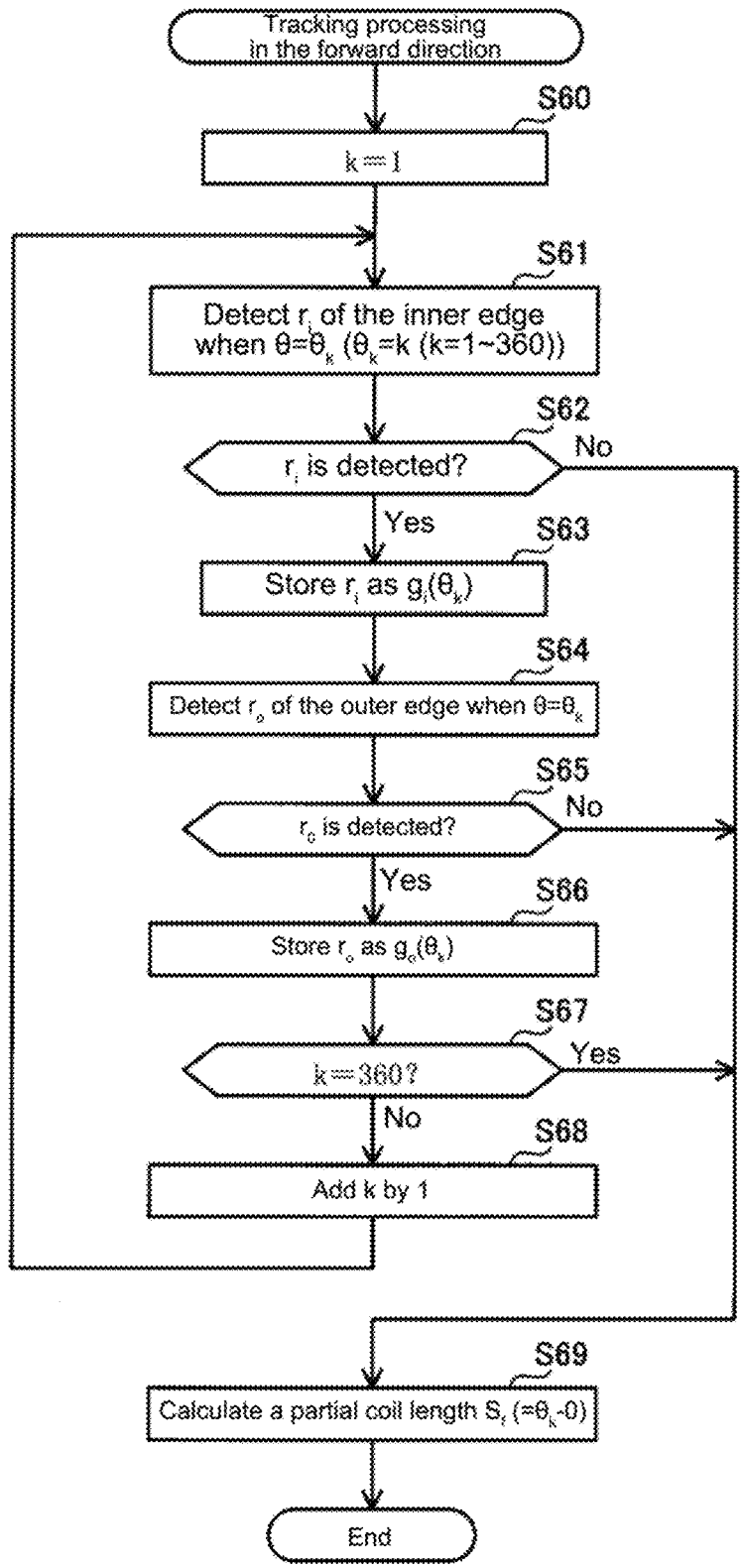
FIG. 2D is a flow chart (fourth portion) showing the shape measurement flow performed for the spiral spring using the shape measurement device of First Example.

As shown in FIG. 2D, firstly, set k=1 in Step S60, and enter Step S61. In Step S61, $r_i$ of the coordinate value of the inner edge of the pixel group 42 when $\theta=\theta_k$($\theta_k$=k (k=1°~360°)) is detected. Here $r_i$ is defined with the following r, that is, the component r on a line with $\theta=\theta_k$ is in a range of $g_i(\theta_k-1)-\delta \leq r \leq g_i(\theta_k-1)+\delta$, and the r satisfies $D(\theta_k, r)=0$ and $D(\theta_k, r+1)=1$. For example, when k=1, on a line with $\theta_1=1°$, r which is in a range of $g_i(0)-\delta \leq r \leq g_i(0)+\delta$ and satisfies $D(\theta_1, r)=0$ and $D(\theta_1, r+1)=1$ is detected as $r_i$ of the coordinate value of the inner edge with $\theta=\theta_1$.

Subsequently, in Step S62, whether $r_i$ of the coordinate value of the inner edge is detected in Step S61 is judged. When there is an r satisfying the above condition ("Yes" in Step S62), it goes to Step S63, and when there is no r satisfying the above condition ("No" in Step S62), it goes to Step S69. Besides, the situation of "No" in Step S62 refers to the following situation: within the range of the above r on the line with $\theta=\theta_k$, the density values of 2 neighboring pixels do not change from the white pixels to the black pixels in the direction of right. That is, specifically, it can be considered that the portion of the coil equivalent to the pixel group 42 when $\theta=\theta_k$ contacts other portions of the coil or has a shape out of the specification, and so on.

In Step S63, $r_i$ detected in Step S61 is stored as $g_i(\theta_k)$. For example, when k=1, $r_i$ of the coordinate value of the inner edge when $\theta=1°$ is stored as $g_i(1)$. The $g_i(\theta_k)$ is stored in the RAM.

In Step S64, the component r of the coordinate value of the outer edge of the pixel group 42 when $\theta=\theta_k$, $r_o$, is detected. Here $r_o$ is defined with the following r: the component r on a line with $\theta=\theta_k$ is in a range of $g_o(\theta_k-1)-\delta \leq r \leq g_o(\theta_k-1)+\delta$, and the r satisfies $D(\theta_k, r)=1$ and $D(\theta_k, r+1)=0$. For example, when k=1, on a line with $\theta_1=1°$, r which is in a range of $g_o(0)-\delta \leq r \leq g_o(0)+\delta$ and satisfies $D(\theta_1, r)=1$ and $D(\theta_1, r+1)=0$ is detected as $r_o$ of the coordinate value of the outer edge with $\theta=\theta_1$.

Subsequently, in Step S65, whether $r_o$ of the coordinate value of the outer edge is detected in Step S64 is judged. When there is r satisfying the above condition ("Yes" in Step S65), it goes to Step S66, and when there is no r satisfying the above condition ("No" in Step S65), it goes to Step S69. Besides, the situation of "No" in Step S65 refers to the following situation: within the range of the above r on the line with $\theta=\theta_k$, the density values of 2 neighboring pixels do not change from the black pixels to the white pixels in the right direction. That is, specifically, it can be considered that the portion of the coil equivalent to the pixel group 42 when $\theta=\theta_k$ contacts the outer hook 34, or contacts other portions of the coil, or has a shape out of the specification, and so on.

In Step S66, $r_o$ detected in Step S64 is stored as $g_o(\theta_k)$. For example, when k=1, $r_o$ of the coordinate value of the outer edge when $\theta=1°$ is stored as $g_o(1)$. The $g_o(\theta_k)$ is stored in the RAM.

Subsequently, in Step S67, it is judged whether k=360. When k is not equal to 360, it is judged "No" in Step S67, k is added by 1 in Step S68 and it returns back to Step S61, to repeat the processing until Step S67. The processing is repeated until it is judged "Yes" in Step S67. Thus, the component r of the coordinate values of the inner edge and the outer edge of the pixel group 42 when $\theta_k$=k(=1°, 2° ... 360°), $r_i$, $r_o$ (tracking in the forward direction), are detected in sequence, and they can be stored as $g_i(\theta_k)$, $g_o(\theta_k)$ in the RAM. On the other hand, when k=360, it is judged "Yes" in Step S67, and it goes to Step S69. Besides, for the situation of "Yes" in Step S67, it refers to the following situation: the portion of the coil equivalent to the pixel group 42 is tracked in the forward direction by the quantity of one turn.

In Step S69, a length of the pixel group 42 until which the tracking in the forward direction is completed is calculated as a partial coil length $S_f$. Specifically, when it goes to Step S69 if it is judged "No" in Step S62 or "No" in Step S65, $r_i$ or $r_o$ in Step S61 or step S64 when $\theta=\theta_k$ is unsuccessfully detected. At this time, the length of the component $\theta$ from $\theta=1°$ to $\theta_k$, i.e. $\theta_k-0°$, is calculated as the partial coil length $S_f$. Besides, when it goes to Step S69 if it is judged "Yes" in Step S67, the partial coil length $S_f$ is 360° (that is, the length of the quantity of one turn of the component $\theta$). If the processing in Step S69 is ended, the tracking processing in the forward direction is ended.

Return back to FIG. 2B to continue with the description. If the tracking in the forward direction is ended in Step S37, it goes to Step S38. In Step S38, $g_o(\theta_k)$ stored upon the tracking processing in the forward direction in Step S37 is stored as $e_o(360 \times K+\theta_k)$, and $g_i(\theta_k)$ is stored as $e_i(360 \times K+\theta_k)$. For example, when K=1, $g_o(\theta_k)$ is stored as $e_o(360+\theta_k)$, and $g_i(\theta_k)$ is stored as $e_i(360+\theta_k)$.

Subsequently, in Step S39, a value obtained by adding the partial coil length $S_f$ calculated in Step S37 to the edge function length L stored in Step S33 is stored (updated) as a new edge function length L. The partial coil length $S_f$ calculated in Step S37 represents the length of the inner edge function and outer edge function of the pixel group 42. Therefore, in Step S39, the value of edge function length L in Step S33+the partial coil length $S_f$ in Step S37 is stored as a new edge function length L. The new edge function length L is stored in the RAM.

Subsequently, in Step S40, a value obtained by adding the partial coil length $S_f$ calculated in Step S37 to the position variable $\theta_p$ set in Step S34 is stored (updated) as a new position variable $\theta_p$.

Subsequently, in Step S41, whether the partial coil length $S_f=360°$ is true is judged. $S_f=360°$ is true when k=360. In other words, the portion of the coil equivalent to the pixel group 42 is tracked by the quantity of one turn in the forward direction. At this time, it is judged "Yes" in Step S41, and it goes to Step S42. On the other hand, when $S_f=360°$ is not true, it is judged "No" in Step S41, and it goes to Step S46 (to be described below).

In Step S42, $g_i(360)$ is updated as $g_i(0)$, and $g_o(360)$ is updated as $g_o(0)$. Herein, $g_i(360)$ is the component r of the coordinate value of the inner edge of the pixel group 42 when $\theta=360°$, $r_i$, and $g_o(360)$ is the component r of the coordinate value of the outer edge of the pixel group 42, $r_o$, when $\theta=360°$. The portion of the spiral spring 30 equivalent to the pixel group 42 follows the portion of the spiral spring 30 equivalent to the pixel group 44. Therefore, $r_i$ of the inner edge and $r_o$ of the outer edge of the pixel group 42 when $\theta=360°$ are respectively equal to $r_i$ of the inner edge and $r_o$ of the outer edge of of the pixel group 44 when $\theta=0°$. That is, in the processing of Step S42, $r_i$ and $r_o$ of the pixel group 42 are calculated using $r_i$ and $r_o$ of the pixel group 42, and they are respectively stored as $g_i(0)$, $g_o(0)$.

Subsequently, in Step S43, whether $K=K_{max}$ is true is judged. Herein, $K_{max}$ is a value exceeding an upper limit value of turns of the spiral spring 30, and is recorded in advance in the computer 22. When the above equation is true ("Yes" in Step S43), it goes to Step S46 (to be described below), and when not true ("No" in Step S43), it goes to Step S44.

In Step S44, K is added by 1, and it returns back to Step S37. For example, in a situation with K=1, $K_{max}$=8, it is judged "No" in Step S43, it is set that K=2 in Step S44, and the tracking processing in the forward direction is performed again in Step S37. When K=2, the processing of the above Steps S60~Step S69 is performed for the pixel group 44. When the processing in Step S37 is ended, the processing of Steps S38~Step S44 is performed for the pixel group 44. In the example shown in FIG. 4, hereafter, for each addition of 1 to K in Step S44, the processing of Steps S37~Step S44 is performed. Moreover, K is added by 1 in Step S44, thus when it is set that K=4, in Step S37, tracking processing in the forward direction is performed for the pixel group 48. At this time, it can be seen from FIG. 4 that it is judged "No" in Step S65 (referring to FIG. 2D), and the partial coil length $S_f$ is calculated in Step S69. Thereafter, after the processing of Steps S38~S40, it is judged "No" in Step S41, and it goes to Step S46.

In Step S46, an outer edge function $e_o(\theta)$ and an inner edge function $e_i(\theta)$ are created. The outer edge function $e_o(\theta)$ is created in a following manner, that is, the coordinate value set $e_o(\theta_j)$ stored in Step S56 (referring to FIG. 2C) and the coordinate value set $e_o(360\times K+\theta_k)$ stored in Step S38 are connected by the $\theta$-r coordinate system to perform approximation for creation. Likewise, the inner edge function $e_i(\theta)$ is created in a following manner, that is, the coordinate value set $e_i(\theta_j)$ stored in Step S53 (referring to FIG. 2C) and the coordinate value set $e_i(360\times K+\theta_k)$ stored in Step S38 are connected by the $\theta$-r coordinate system to perform approximation for creation. When the processing of Step S46 is ended, the creation processing for the outer/inner edge function is ended.

Return back to FIG. 2A to continue with the description. In Step S16, when the creation processing for the outer/inner edge function is ended, in Step S18, whether the edge function length L stored in Step S16 exceeds a lower-limit threshold value is judged (referring to Step S39 of FIG. 2B). Herein, the lower-limit value is a lower limit value (with a unit of angle "°") of turns of the spiral spring 30, and is recorded in advance in the computer 22. When the edge function length L exceeds the lower-limit threshold value ("Yes" in Step S18), it goes to Step S20. On the other hand, when the edge function length L is equal to or smaller than the lower-limit threshold value ("No" in Step S18), it goes to Step S28. Besides, the situation of "No" in Step S18 refers to, for example, can be considered as insufficient number of turns of the spiral spring 30 (first situation), or contact of neighboring coils with each other (second situation), foreign matters being clamped between neighboring coils (third situation), and so on.

In Step S28 after it is judged "No" in Step S18, the spiral spring 30 is determined as a defective product, and a defective part is reflected in an image of the spiral spring on the display 20. Specifically, in the second situation and the third situation, the position variable $\theta_p$ stored in Step S40 (referring to FIG. 2B) represents a contact part or a part with foreign matters. Therefore, in Step S28, polar-coordinate inverse conversion is performed for $(\theta_p, e_i(\theta_p))$ or $(\theta_p, e_o(\theta_p))$, so as to calculate the contact part or the part with foreign matters on an xy plane, and reflect these defective parts on the image of the spiral spring on the display 20.

Figure 5:
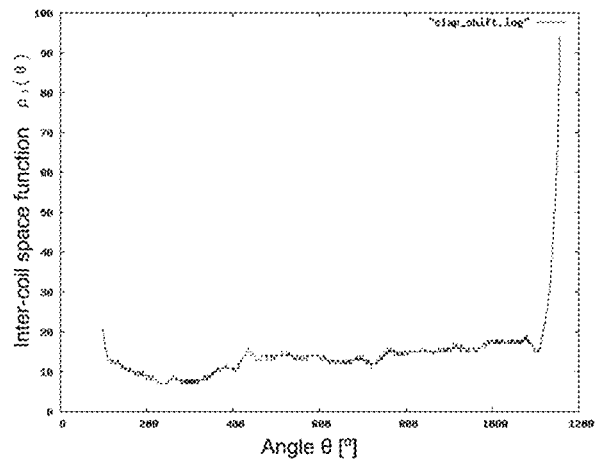
FIG. 5 is a graph representing an inter-coil space function.

Subsequently, in Step S20, an inter-coil space function $\rho_1(\theta)$ is calculated according to an outer edge function $e_o(\theta)$ and an inner edge function $e_i(\theta)$ created in Step S16. FIG. 5 shows one example of the inter-coil space function $\rho_1(\theta)$. The inter-coil space function $\rho_1(\theta)$ is defined by a following formula: $\rho_1(\theta)=e_i(\theta+360°)-e_o(\theta)$. The inter-coil space function $\rho_1(\theta)$ is a function representing the space between neighboring coils of the spiral spring 30.

Subsequently, in Step S22, a lower-limit threshold value function $\rho_{1min}(\theta)$ is read out from the memory, and it is determined in an angle range as a checked object whether the inter-coil space function $\rho_1(\theta)$>lower-limit threshold value function $\rho_{1min}(\theta)$ is true. When the above inequation is true ("Yes" in Step S22), it goes to Step S24, and when not true ("No" in Step S22), the spiral spring 30 is determined as a defective product in Step S28 (to be described below).

In Step S24, an upper-limit threshold value function $\rho_{1max}(\theta)$ is read out from the memory, and it is determined in an angle range as a checked object whether the inter-coil space function $\rho_1(\theta)$<upper-limit threshold value function $\rho_{1max}(\theta)$ is true. When the above inequation is true ("Yes" in Step S24), it goes to Step S26, and when not true ("No" in Step S24),the spiral spring 30 is determined as a defective product in Step S28 (to be described below).

In Step S28 after it is judged "No" in Steps S22, S24, the spiral spring 30 is determined as a defective product, and a defective part is reflected in an image of the spiral spring on the display 20. Specifically, $\theta$ when the inter-coil space function $\rho_1(\theta)$ is an abnormal value is taken as $\theta_{err}$, to determine the coordinate values $(\theta_{err}, e_o(\theta_{err}))$, $(\theta_{err}, e_i(\theta_{err}))$ of the inner/outer edge function corresponding to $\rho_1(\theta_{err})$. Then, polar-coordinate inverse conversion is performed for the coordinate values, so as to calculate the defective part on the xy plane, and reflect the defective part on the image of the spiral spring on the display 20.

Figure 6:
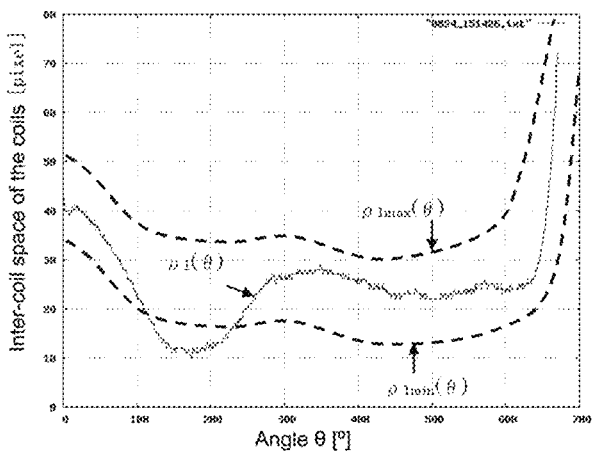
FIG. 6 is a graph representing an inter-coil space function, a lower-limit threshold value function, and an upper-limit threshold value function.

In Step S26, the spiral spring 30 is determined as a good product on the basis of determination results in Steps S22 and S24. FIG. 6 shows examples of the inter-coil space function $\rho_1(\theta)$, the lower-limit threshold value function $\rho_{1min}(\theta)$, and the upper-limit threshold value function $\rho_{1max}(\theta)$. In the examples of FIG. 6, within a range of about $120°<\theta<$about $230°$, $\rho_1(\theta)<\rho_{1min}(\theta)$. Therefore, it is judged "No" in Step S22, and the spiral spring is determined as a defective product in Step S28. In the present example, whether the spiral spring 30 is good or not is determined on the basis of whether $\rho_{1min}(\theta)<\rho_1(\theta)<\rho_{1max}(\theta)$ is true.

According to the structure, by controlling the lower-limit threshold value function $\rho_{1min}(\theta)$ and the upper-limit threshold value function $\rho_{1max}(\theta)$ stored in advance in the memory, the spiral spring with a desired inter-coil space shape can be manufactured. Thus, the properties of the spiral spring can be stabilized.

Besides, the lower-limit threshold value function $\rho_{1min}(\theta)$ and the upper-limit threshold value function $\rho_{1max}(\theta)$ also can be decided according to design drawings or design data, and also can be decided according to an FEM analysis result of the design data and so on. Within the angle range as a checked object, the lower-limit threshold value function $\rho_{1min}(\theta)$ and the upper-limit threshold value function $\rho_{1max}(\theta)$ also can be constant values. Besides, it is also feasible to only perform any one processing in Steps S22 and S24.

Besides, in the above Step S20, the inter-coil space function $\rho_1(\theta)$ is calculated, while the coil thickness function $\rho_2(\theta)$ also can be calculated instead of $\rho_1(\theta)$. The coil thickness function $\rho_2(\theta)$ is defined by a following formula: $\rho_2(\theta)=e_o(\theta)-e_i(\theta)$. The coil thickness function $\rho_2(\theta)$ is a function representing the thickness (plate thickness of the coil) of the coil of the spiral spring 30. At this time, a lower-limit threshold value function $\rho_{2min}(\theta)$ and an upper-limit threshold value function $\rho_{2max}(\theta)$ of the coil thickness also may be stored in advance in the memory, and in Step S22, whether $\rho_2(\theta)>\rho_{2min}(\theta)$ is true is determined. Whether $\rho_2(\theta)<\rho_{2max}(\theta)$ is true also may be determined in Step S24.

Alternatively, it also can be calculated in Step S20 both the inter-coil space function $\rho_1(\theta)$ and the coil thickness function $\rho_2(\theta)$, and whether both functions satisfy the above inequations is determined in Steps S22 and S24.

Figure 7:
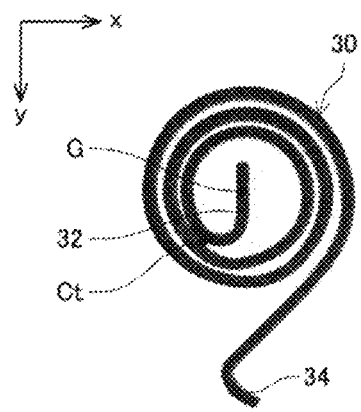
FIG. 7 is a figure showing a photographic image of the spiral spring of the first type with neighboring coils contacting with each other.
Figure 8:
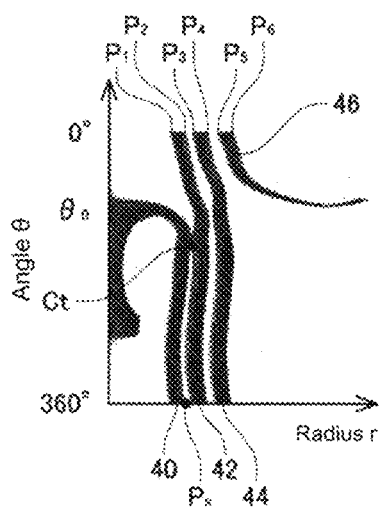
FIG. 8 is a figure showing a polar-coordinate image of the spiral spring of FIG. 7.

Herein, the situation of neighboring coils contacting with each other is described. FIG. 7 shows a photographic image of the spiral spring 30, neighboring coils of the spiral spring 30 contacting with each other at a contact point Ct, and FIG. 8 shows a polar-coordinate image of the spiral spring 30. It can be seen from FIG. 7 and FIG. 8 that if neighboring coils contact with each other, neighboring stripe-shape pixel groups contact with each other in the polar-coordinate image. In this example, since the pixel group 40 contacts the pixel group 42, it is judged "No" by the computer 22 in Step S55 of the tracking processing in the reverse direction (referring to FIG. 2C), and the partial coil length $S_r$ is calculated in Step S59 (the tracking in the reverse direction is ended at the contact point Ct). Moreover, after the processing of Steps S33~S36 (referring to FIG. 2B), the tracking processing in the forward direction is started (referring to FIG. 2D). Then, it is judged "No" by the computer 22 in Step S62, and the partial coil length $S_f$ is calculated in Step S69 (the tracking in the forward direction is ended at the contact point Ct). Subsequently, after the processing of Steps S38~S40 (referring to FIG. 2B), it is judged "No" in Step S41, and the outer/inner edge function is created up to a place where the tracking is performed. At this time, the edge function length $L=S_r+S_f$. Therefore, it is judged "No" by the computer 22 in Step S18 (referring to FIG. 2A), and the spiral spring 30 is determined as a defective product in Step S28. Besides, instead of the above determination method, a following structure may be used: configuring the processing for determining the pixel group A, so as to end the tracking in the reverse direction when the coordinate values of the pixels constituting the pixel group A are detected in the tracking of the pixel group 40 in the reverse direction. Likewise, a following structure also may be used: configuring the processing for determining the pixel group B, so as to end the tracking in the forward direction when the coordinate values of the pixels constituting the pixel group B are detected in the tracking of the pixel group 48 (the pixel group 46 in FIG. 10) in the forward direction.

Effects of the above shape measurement device 10 are described. If the space between neighboring coils (also referred to as "inter-coil space" hereinafter) is in an unnatural shape, the spiral spring cannot satisfy the required performances. For example, if the inter-coil space is too narrow, the coils contact with each other so as to generate abnormal noises, or have increased hysteresis, or cause breakage. On the other hand, if the inter-coil space is too wide, there is a situation that a specified torque cannot be ensured. In the past check methods, even for such spiral springs, if a shape of a specific part satisfies the determination criteria for a good product, the spiral spring still will be determined as a good product, therefore, the check methods have problems. In this regard, in the shape measurement device 10 disclosed in the present description, the inter-coil space function $\rho_1(\theta)$ is calculated by the computer 22. Thus, the inter-coil space which is not detected in the past can be detected. Therefore, the shape of the spiral spring 30 can be appropriately measured, as a result, quality inspection for spiral springs can be appropriately carried out.

Figure 27:
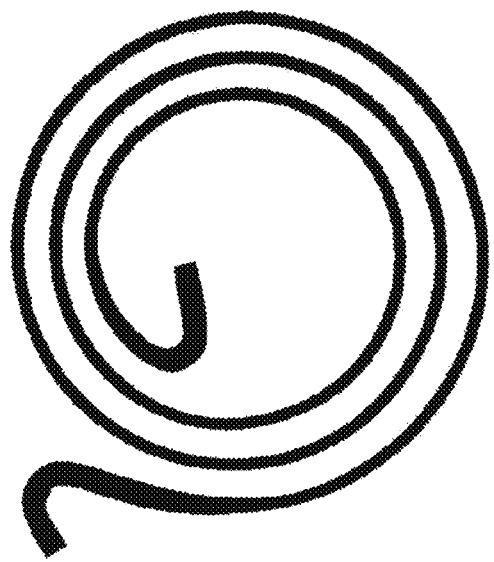
FIG. 27 is a figure showing a photographic image of the spiral spring having different coil thicknesses.

Besides, among the spiral springs, there are spiral springs having a special shape with inconstant coil thicknesses (for example, a spiral spring as shown in FIG. 27, with only inner hook and outer hook having a relatively large coil thickness). In order to appropriately measure the shape of such spiral springs, the thickness of the coil needs to be measured. In the above shape measurement device 10, the coil thickness function $\rho_2(\theta)$ is calculated by the computer 22. Thus, the coil thickness which is not checked in the past can be checked, and the shape of the spiral spring can be appropriately measured.

Besides, in the above shape measurement device 10, the inter-coil space shape and/or the coil thickness is determined to be good or not on the basis of the threshold value functions $(\rho_{1min}(\theta), \rho_{1max}(\theta), \rho_{2min}(\theta), \rho_{2max}(\theta))$ stored in advance in the memory. Therefore, the quality of the spiral spring 30 can be quantitatively determined.

Besides, in the above shape measurement device 10, the polar-coordinate image is created by the computer 22 by performing the polar-coordinate conversion for the photographic image. The inter-coil space function $\rho_1(\theta)$ and/or the coil thickness function $\rho_2(\theta)$ is calculated by tracking boundaries of the coil and background of the polar-coordinate image. The algorithm of tracking boundaries can overcome the noise of the image, and can be constructed relatively simply. Therefore, even if noise of a certain degree is contained in the polar-coordinate image, the boundaries still can be correctly tracked. Besides, the inter-coil space function $\rho_1(\theta)$ and/or the coil thickness function $\rho_2(\theta)$ can be calculated within a relatively short period of time. Therefore, the shape measurement method using the polar-coordinate image as First Example is suitable to on-line check.

Subsequently, in First Variant~Fourth Variant, the determination method and the quantitative evaluation method replacing Steps S22 and S24 in First Example are described. Besides, same characters may be used in the following variants. In each variant, if a character is defined, the character complies with the definition, and if there is no special definition, a universal definition is complied with.

(First Variant)

In the present variant, firstly, in a registration procedure, N (for example, N=300) spiral springs that are determined as good products using any method are prepared, and processing of Steps S10~S20 in First Example is carried out to calculate respective inter-coil space functions $\rho_{1n}(\theta)$ (n=1~N). Moreover, a mean value μ(θ) and a standard deviation σ(θ) of these inter-coil space functions $\rho_{1n}(\theta)$ are calculated, and they are used to create following determination functions of Expression 1 and Expression 2, and the determination functions are registered in the memory of the computer 22. Herein, $\theta_i$(i:0~m, m:integer) in the following expressions represents angles at an interval of s° (that is, $\theta_i = \theta_o + i \cdot s$), and k represents an arbitrarily set constant.

$$D(\theta_i) = \begin{cases} 1 & \mu(\theta_i) - k\sigma(\theta_i) \leq \rho_1(\theta_i) < \mu(\theta_i) + k\sigma(\theta_i) \\ 0 & \begin{pmatrix} \mu(\theta_i) - k\sigma(\theta_i) > \rho_1(\theta_i) \text{ or} \\ \rho_1(\theta_i) > \mu(\theta_i) + k\sigma(\theta_i) \end{pmatrix} \end{cases}$$ [Expression 1]

$$D_s = \prod_{i=0}^{m} D(\theta_i)$$ [Expression 2]

Figure 11:
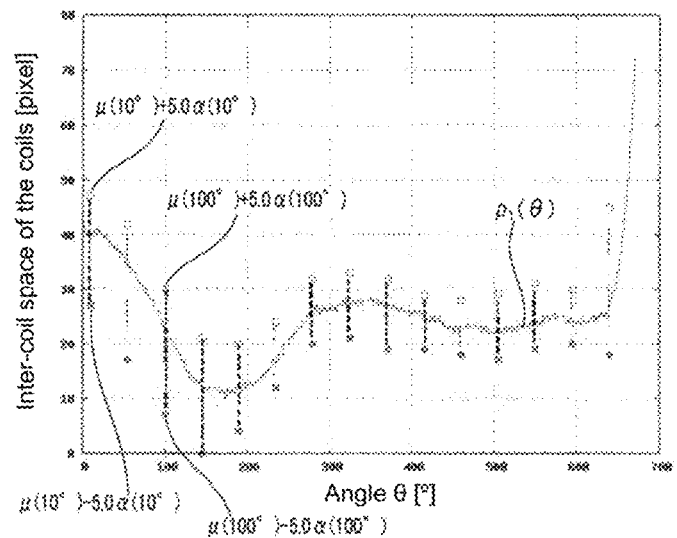
FIG. 11 is a graph for illustrating a good-or-not determination method in First Variant of First Example.

Moreover, in the detection procedure or the manufacturing procedure for the spiral spring, the inter-coil space function $\rho_1(\theta)$ of the spiral spring 30 as the measurement object is calculated, and $D_s$ of the function $\rho_1(\theta)$ is calculated using the determination function stored in the memory. When $D_s=1$, the spiral spring is determined as a good product (Step S26), and when $D_s=0$, the spiral spring is determined as a defective product (Step S28). FIG. 11 shows a graph representing a relation between the inter-coil space function $\rho_1(\theta)$, the mean value $\mu(\theta_i)$, and the standard deviation $\sigma(\theta_i)$. In the graph of FIG. 11, it is set that $\theta_0=10°$, s=45°, k=5.0. In the graph of FIG. 11, since $D(\theta_i)$ of each $\theta_i$ is 1, $D_s=1$, the spiral spring 30 as the measurement object is determined as a good product. The smaller the values of s and k, the stricter the determination criteria. Besides, the mean value μ(θ), and the standard deviation σ(θ) also can be determined according to the design drawing or the design data, and also can be determined according to the FEM analysis result of the design data and so on.

Furthermore, a magnitude of the deformation of the inter-coil space of the spiral spring 30, compared with a good product, can be quantitatively evaluated using a plus deformation degree $T_{r+}(\theta_i)$ indicated by following Expression 3 and A minus deformation degree $T_{r-}(\theta_i)$ indicated by following Expression 4. The plus deformation degree $T_{r+}(\theta_i)$ is a scale for quantification of "how much larger compared with the good product" for the inter-coil space of the spiral spring 30 with the angle $\theta_i$. The minus deformation degree $T_{r-}(\theta_i)$ expressed by Expression 4 is a scale for quantification of "how much smaller compared with the good product" for the inter-coil space of the spiral spring 30 with the angle $\theta_i$.

$T_{r+}(\theta_i) =$ [Expression 3]

$$\begin{cases} \rho_1(\theta_i) + \{\mu(\theta_i) + k\sigma(\theta_i)\} & (\rho_1(\theta_i) > \mu(\theta_i) + k\sigma(\theta_i)) \\ 0 & (\rho_1(\theta_i) \leq \mu(\theta_i) + k\sigma(\theta_i)) \end{cases}$$

$T_{r-}(\theta_i) =$ [Expression 4]

$$\begin{cases} \{\mu(\theta_i) - k\sigma(\theta_i)\} - \rho_1(\theta_i) & (\mu(\theta_i) - k\sigma(\theta_i) > \rho_1(\theta_i)) \\ 0 & (\mu(\theta_i) - k\sigma(\theta_i) \leq \rho_1(\theta_i)) \end{cases}$$

The plus deformation degree $T_{r+}(\theta_i)$ and the minus deformation degree $T_{r-}(\theta_i)$ are calculated by the computer 22 using Expression 3 and Expression 4, and "how much magnitude of the deformation of which portion of the spiral spring 30" is displayed on the display 20. An operator for the manufacturing procedure of the spiral spring modifies molding parameters of the spiral spring forming device by confirming the deformation degrees $T_{r+}(\theta_i)$, $T_{r-}(\theta_i)$ of the spiral spring displayed on the display 20, thus the quality of the spiral spring products can be improved.

(Second Variant)

In the present variant, whether the spiral spring 30 is good or not is determined using a commonly known method, i.e. Mahalanobis-Taguchi Method. Specifically, firstly, in a registration procedure, N (for example, N=300) spiral springs that are determined as good products using any method are prepared, and respective inter-coil space functions $\rho_{1n}(\theta)$ (n=1~N) are calculated. Then, a mean value $\rho(\theta_i)$ and a variance $\{\sigma(\theta_i)\}^2$ of N inter-coil spaces $\rho_{1n}(\theta_i)$ when $\theta=\theta_i$ (i:0~m, m:integer) are calculated using following Expression 5. Herein, $\theta_i$ represents angles at an interval of s° (that is, $\theta_i=\theta_o+i\cdot s$). In the procedure of registering the shape of good product of the spiral spring, a quality controller operates a "spiral spring shape registration software", to store in the memory of a computer 22, the mean value $\mu(\theta_i)$ and the standard deviation $\sigma(\theta_i)$ calculated for each of the spiral springs of each serial number.

$$\mu(\theta_i) = \frac{1}{N}\sum_{n=1}^{N}\rho_{1n}(\theta_i),$$ [Expression 5]

$$\{\sigma(\theta_i)\}^2 = \frac{1}{N}\sum_{n=1}^{N}(\rho_{1n}(\theta_i) - \mu(\theta_i))^2$$

Subsequently, respective standardized mean spaces $X_{i,n}$ of N inter-coil space functions $\rho_{1n}(\theta)$ are calculated using following Expression 6.

$$X_{i,n} = \frac{\rho_{1n}(\theta_i) - \mu(\theta_i)}{\sigma(\theta_i)}$$ [Expression 6]

Subsequently, a correlation matrix R is calculated using following Expression 7~Expression 9. Herein, k represents the number of $\theta_i$ (i.e. k=m+1). Besides, p, q represents any number from n=1~k.

$$r_{p,q} = r_{q,p} = \frac{\sum_{i=1}^{N}(X_{i,p} \times X_{i,n})}{\sqrt{\sum_{i=1}^{N}X_{i,p}^2}\sqrt{\sum_{i=1}^{N}X_{i,q}^2}}$$ [Expression 7]

$$r_{p,p} = 1$$ [Expression 8]

$$R = \begin{pmatrix} r_{0,0} & r_{0,1} & \cdots & r_{0,k-1} \\ r_{1,0} & r_{1,1} & & r_{1,k-1} \\ \vdots & & \ddots & \\ r_{k-1,0} & r_{k-1,1} & \cdots & r_{k-1,k-1} \end{pmatrix}$$ [Expression 9]

Subsequently, an inverse matrix A of the correlation matrix R is calculated using following Expression 10. In the procedure of registering the shape of good product of the spiral spring, the quality controller operates the "spiral spring shape registration software", to store in the memory of the computer 22 the inverse matrix A calculated for each of the spiral springs of each serial number.

$$A = R^{-1} = \begin{pmatrix} a_{0,0} & a_{0,1} & \cdots & a_{0,k-1} \\ a_{1,0} & a_{1,1} & & a_{1,k-1} \\ \vdots & & \ddots & \\ a_{k-1,0} & a_{k-1,1} & \cdots & a_{k-1,k-1} \end{pmatrix}$$ [Expression 10]

Subsequently, the processing of a check procedure (or a manufacturing procedure) for the spiral spring is described. In the memory of the computer 22, following equations of Expression 11 and Expression 12 are stored in advance. In the check procedure (the manufacturing procedure) for the spiral spring, the inter-coil space function $\rho_1(\theta)$ of the spiral spring 30 as the measurement object is calculated, and a standardized mean space $X_i$ of the inter-coil space function $\rho_1(\theta_i)$ is calculated using the following Expression 11. Subsequently, the standardized mean space $X_i$ and the inverse matrix A stored in the memory are put in the equation of Expression 12, to calculate a mahalanobis distance D.

$$X_i = \frac{\rho_1(\theta_i) - \mu(\theta_i)}{\sigma(\theta_i)}$$ [Expression 11]

$$D = \sqrt{\frac{1}{k}(X_0, X_1, \ldots, X_{k-1}) \begin{pmatrix} a_{0,0} & a_{0,1} & \cdots & a_{0,k-1} \\ a_{1,0} & a_{1,1} & & a_{1,k-1} \\ \vdots & & \ddots & \vdots \\ a_{k-1,0} & a_{k-1,1} & \cdots & a_{k-1,k-1} \end{pmatrix} \begin{pmatrix} X_0 \\ X_1 \\ \vdots \\ X_{k-1} \end{pmatrix}}$$ [Expression 12]

In the memory of the computer 22, a threshold value of the mahalanobis distance D is stored in advance. After the mahalanobis distance D is calculated using Expression 12, it is compared with the threshold value stored in the memory. If D≤threshold value, the spiral spring is determined as a good product (Step S26), and if D>threshold value, the spiral spring is determined as a defective product (Step S28). According to the determination method of the present variant, even in a situation that it is hard to set the determination criteria for the defective product, the determination still can be appropriately carried out.

Herein, the mahalanobis distance D can be regarded as a scale for quantitatively evaluating the deformation degree of the spiral spring 30. The computer 22 also can be configured to display the deformation degree D on the display 20. At this time, an operator for the procedure of manufacturing the spiral spring 30 modifies molding parameters of the spiral spring forming device by confirming the deformation degree D displayed on the display 20, thus the quality of the spiral spring products can be improved. This structure is also applicable to Third Variant.

(Third Variant)

In the present variant, similarly, firstly N (for example, N=300) spiral springs that are determined as good products using any method are prepared, and respective inter-coil space functions $\rho_{1,n}(\theta)$ (n=1~N) are calculated. Subsequently, an FFT frequency spectrum $F_n(i)$ (i:1~M) of respective inter-coil space function $\rho_{1,n}(\theta)$ is calculated, and a mean value $\mu(i)$ and a variance $\{\sigma(i)\}^2$ of the N FFT frequency spectrum $F_n(i)$ are calculated using following Expression 13. A quality controller operates the "spiral spring shape registration software", to store in the memory of the computer 22 in advance the mean value $\mu(i)$ and the standard deviation $\sigma(i)$ calculated for each of the spiral springs of each serial number.

$$\mu(i) = \frac{1}{N}\sum_{n=1}^{N} F_n(i), \ \{\sigma(i)\}^2 = \frac{1}{N}\sum_{n=1}^{N} (F_n(i) - \mu(i))^2$$ [Expression 13]

Subsequently, respective standardized mean space $X_{i,n}$ of N inter-coil space functions $\rho_{1,n}(\theta)$ is calculated using following Expression 14.

$$X_{i,n} = \frac{F_n(i) - \mu(i)}{\sigma(i)}$$ [Expression 14]

Subsequently, a correlation matrix R is calculated using following Expression 7~Expression 9 in Second Variant and an inverse matrix A of the correlation matrix R is calculated using Expression 10 in Second Variant. A quality controller operates the "spiral spring shape registration software", to store in the memory of the computer 22 in advance the inverse matrix A calculated for each of the spiral springs of each serial number.

In the memory of the computer 22, following Expression 15 and an expression the same as Expression 12 in Second Variant are stored. In the detection procedure (or the manufacturing procedure) for the spiral spring, the inter-coil space function $\rho_1(\theta)$ of the spiral spring 30 as a measurement object is calculated, an FFT frequency spectrum F(i) thereof is calculated, and a standardized mean space $X_i$ of the FFT frequency spectrum F(i) is calculated using the following Expression 15. Herein, when the spiral spring 30 is deformed, features of deformation will appear in a low frequency component (i=$m_1$~$m_2$, 1≤$m_1$, $m_2$<M) of the FFT frequency spectrum F(i). Therefore, in the present variant, the standardized mean space $X_i$ within the range of i=$m_1$~$m_2$ is calculated. After the standardized mean space $X_i$ is calculated, $X_i$ and the inverse matrix A stored in the memory are put in the equation of Expression 12, so as to calculate the mahalanobis distance D.

$$X_i = \frac{F(i) - \mu(i)}{\sigma(i)}$$ [Expression 15]

In the memory of the computer 22, a threshold value of the mahalanobis distance D is stored in advance. After the mahalanobis distance D is calculated using Expression 12, it is compared with the threshold value stored in the memory. If D≤threshold value, the spiral spring is determined as a good product (Step S26), and if D>threshold value, the spiral spring is determined as a defective product (Step S28).

(Fourth Variant)

In the present variant, the FFT frequency spectrum $F_n(i)$ (i:1~M) of respective inter-coil space function $\rho_{1,n}(\theta)$ of N good products of the spiral spring is calculated using the same method as that in Third Variant. In the procedure of registering the shape of good product of the spiral spring, a mean value µ and a variance $\sigma^2$ of a low frequency power $\rho_n$ of the low frequency component of the FFT frequency spectrum $F_n(i)$ are calculated using following Expression 16 and Expression 17. A quality controller operates the "spiral spring shape registration software", to store in advance in the memory of the computer 22 the mean value µ and the standard deviation σ calculated for each of the spiral springs of each serial number.

$$p_n = \frac{1}{m_2 - m_1 + 1} \sum_{i=m_1}^{m_2} F_n(i) \qquad \text{[Expression 16]}$$

$$\mu = \frac{1}{N}\sum_{n=1}^{N} p_n, \; \sigma^2 = \frac{1}{N}\sum_{n=1}^{N}(p_n - \mu)^2 \qquad \text{[Expression 17]}$$

Subsequently, in the detection procedure (or the manufacturing procedure), the inter-coil space function $\rho_1(\theta)$ of the spiral spring 30 as a measurement object is calculated, an FFT frequency spectrum F(i) thereof is calculated, and a low frequency power p is calculated using following Expression 18.

$$p = \frac{1}{m_2 - m_1 + 1} \sum_{i=m_1}^{m_2} F(i) \qquad \text{[Expression 18]}$$

In the memory of the computer 22, a following inequation of Expression 19 is stored in advance. Herein, k is an arbitrarily set constant. After being calculated using Expression 18, the low frequency power is put in the following inequation, and whether the inequation is true is determined. When the inequation is true, the spiral spring is determined as a good product (Step S26), and if not true, the spiral spring is determined as a defective product (Step S28).

[Expression 19]

$\mu - k\sigma \leq p \leq \mu + k\sigma$ (Fifth Variant)

In First Example, the polar-coordinate image is created by performing the image conversion for (the binarized image of) the photographic image photographed by the CCD camera 16, but the object of image conversion is not limited to the photographic image, but also may be measurement data measured by, for example, a laser displacement meter and so on. In the present variant, two methods for calculating the inter-coil space function $\rho_1(\theta)$ and the coil thickness function $\rho_2(\theta)$ using the measurement data produced by measuring the spiral spring 30 with the laser displacement meter are described.

(Method 1)

Figure 13:
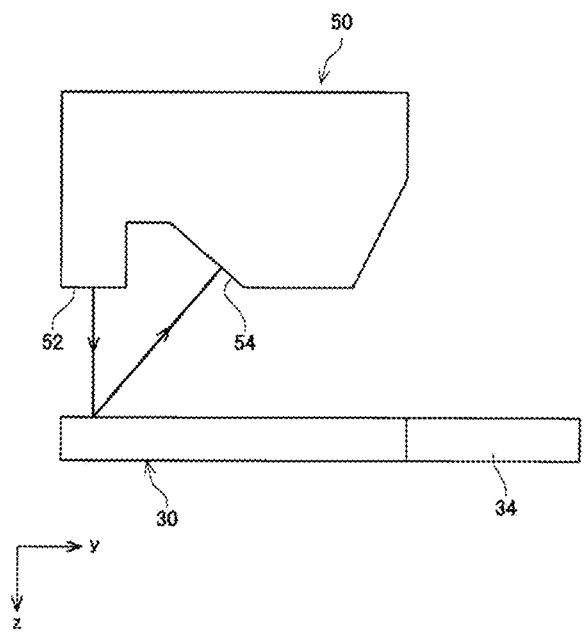
FIG. 13 is a figure for illustrating a laser displacement meter in Fifth Variant of First Example.

In the shape measurement device of the present variant, the CCD camera 16 in FIG. 1 is replaced by a laser displacement meter 50 show in FIG. 13. As shown in FIG. 13, the laser displacement meter 50 is provided with an irradiation portion 52 for emitting laser light, and a light receiving face 54 for receiving reflected light reflected by an object (the spiral spring 30). The laser displacement meter 50 can move in an x direction. The spiral spring 30 is disposed on a workbench (omitted in the figures) having a carrying face on the xy plane. The workbench can move in a y direction. The laser displacement meter 50 is disposed right over the spiral spring 30, with the irradiation portion 52 thereof emitting laser light downwards (z direction).

Figure 12:
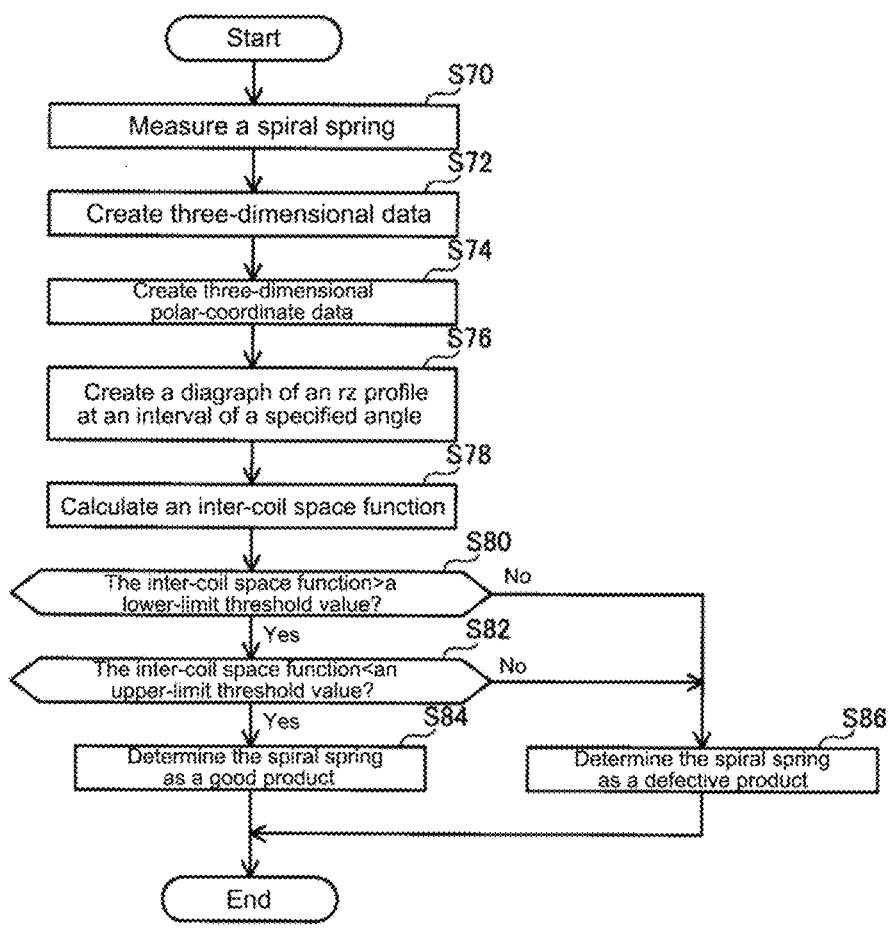
FIG. 12 is a flow chart showing a shape measurement flow performed for a spiral spring using the shape measurement device in Fifth Variant of First Example.

FIG. 12 is a flow chart showing a shape measurement flow performed for the spiral spring 30 using the shape measurement device of the present variant. Firstly, in Step S70, the shape of the spiral spring 30 is measured by the laser displacement meter 50. Specifically, the laser displacement meter 50 is enabled to move in the x direction in a state that the workbench is fixed, and emits laser light to the spiral spring 30 from one end to the other end in the x direction of the spiral spring 30. The processing is repeated while the workbench is enabled to move in the y direction, thus the whole spiral spring 30 is irradiated with the laser light.

Figure 14:
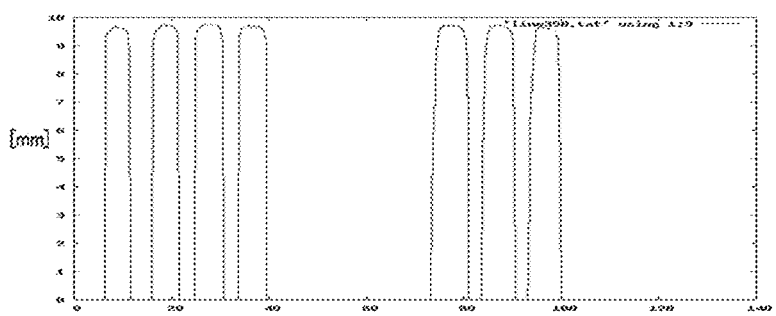
FIG. 14 is a figure showing profile data of a spiral spring.
Figure 15:
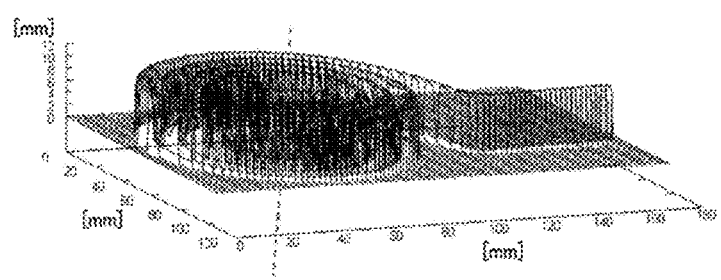
FIG. 15 is a graph showing three-dimensional data of the spiral spring comprised by the profile data in FIG. 14.

Subsequently, in Step S72, three-dimensional data is created on the basis of the measurement data measured in Step S70. Specifically, profile data of the spiral spring 30 as shown in FIG. 14 is created according to the measurement data when the laser light is emitted in a state that the workbench is fixed. A plurality of profile data are created along the y direction. These profile data are recreated so as to create the three-dimensional data as shown in FIG. 15. Herein, processing from this Step S72 to subsequent Step S86 is executed by the computer 22.

Figure 16:
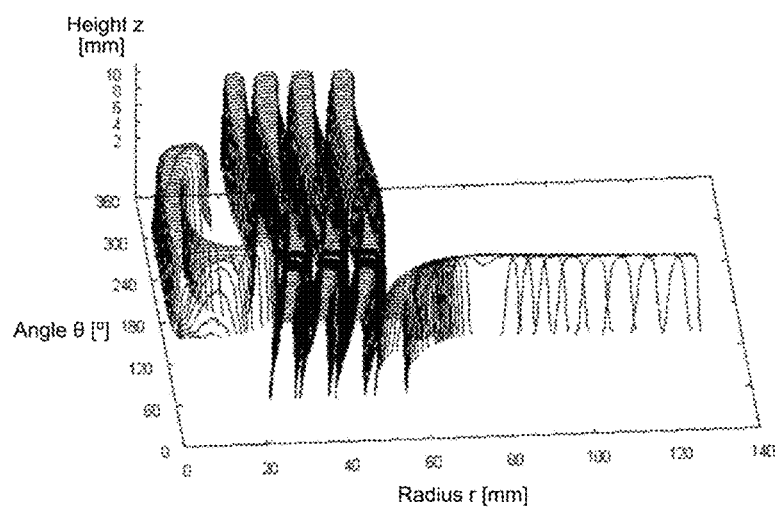
FIG. 16 is a graph showing polar-coordinate data of three-dimensional data in FIG. 15.

Subsequently, in Step S74, polar-coordinate conversion is performed for the three-dimensional data created in Step S72, so as to create a three-dimensional polar-coordinate data as shown in FIG. 16. Specifically, a central axis (for example, a center of gravity) is calculated according to the three-dimensional data (referring to broken lines in FIG. 15), and the polar-coordinate conversion is performed for the three-dimensional data with the central axis as the center.

Figure 17:
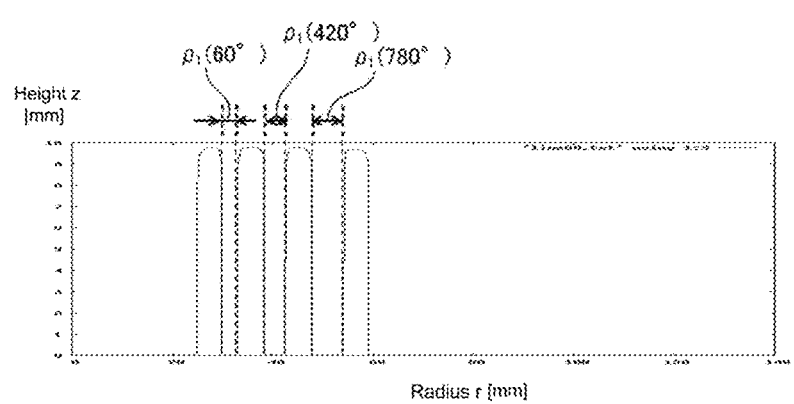
FIG. 17 is a graph of the profile when θ=60° in the polar-coordinate data in FIG. 16.

Subsequently, in Step S76, the three-dimensional polar-coordinate data created in Step S74 is cut off on an rz plane (radius-height plane) at an interval of a specified angle, so as to create the graph of the rz profile as shown in FIG. 17. FIG. 17 is a graph of the rz profile when θ=60°. Subsequently, in Step S78, according to the graph of the rz profile created in Step S76, the inter-coil space is calculated, and the inter-coil space function $\rho_1(\theta)$ is calculated. For example, according to the graph of FIG. 17, the inter-coil spaces $\rho_1(60°)$, $\rho_1(420°)$, $\rho_1(780°)$ when θ=60°, 420°, 780° are calculated. The processing is performed for the graph of respective rz profile, and the obtained inter-coil spaces are connected for performing approximation, so as to calculate the inter-coil space function $\rho_1(\theta)$. Subsequently, in Steps S80~S86, whether the spiral spring 30 is good or not is determined. Such processing are the same as the processing (referring to FIG. 2B) in Steps S22~S28 in First Example.

Besides, in Step S78, instead of the inter-coil space function $\rho_1(\theta)$, the pitch function $\rho_3(\theta)$ representing the distance (pitch) between coil cores of neighboring coils also can be calculated. Specifically, the coil core (a line passing through a center of the coil in a width direction) also may be extracted from the graph of the rz profile in Step S76, so as to calculate the distance between the coil cores, thus the pitch function $\rho_3(\theta)$ is calculated. In a common spiral spring 30, the coil thickness is substantially constant from the inner hook 32 to the outer hook 34. Since the pitch=the inter-coil space+the coil thickness, if the coil thickness is substantially constant, dynamic conditions of the inter-coil space function $\rho_1(\theta)$ and the pitch function $\rho_3(\theta)$ are substantially the same. Therefore, the good-or-not determination method on the basis of the pitch function $\rho_3(\theta)$ is also useful.

(Method 2)

In this method, the same processing as in the above method 1 is carried out until Step S72. Then, the three-dimensional data created in Step S72 is converted to a two-dimensional image. Specifically, a value of an axis z of the three-dimensional data is converted to a density of the image. That is, a coordinate value with the value of axis z being smaller than a threshold value is converted to a density value of 0, and a coordinate value with the value of axis z being equal to or greater than a threshold value is converted to a density value of 1. Thus, binarized polar coordinate image is created. The following processing are the same as the processing after Step S16 in First Example (referring to FIG. 2A, FIG. 2B).

Besides, the method for performing shape measurement using the laser displacement meter 50 is described in Fifth Variant, but the type of the displacement meter is not limited thereto. For example, a pattern projection type sensor, an optical sensor using a wavelength confocal manner, a 3D-TOF camera of a pulse laser type, and a displacement sensor carrying a parallel-light LED also may be used. That is, the irradiated light is not limited to laser light, but also may be all types of light containing microwaves, millimeter waves, TeraHertz waves and other electric waves (electromagnetic waves).

Besides, the determination method or the evaluation method in First Variant~Fourth Variant is also applicable to the shape measurement method in Fifth Variant. Furthermore, they are also applicable to following Second Example, Third Example, and variants thereof.

SECOND EXAMPLE

Subsequently, the shape measurement device in Second Example is described with reference to FIG. 18~FIG. 20. Below merely points different from First Example are described, and detailed description for the same structures as those in First Example is omitted. Third Example is also in the same case. Besides, in Second Example and Third Example, the spiral spring 30 of the second type is taken as an example for the description, but the same measurement method is also applicable to the spiral spring 30 of the first type.

Figure 18:
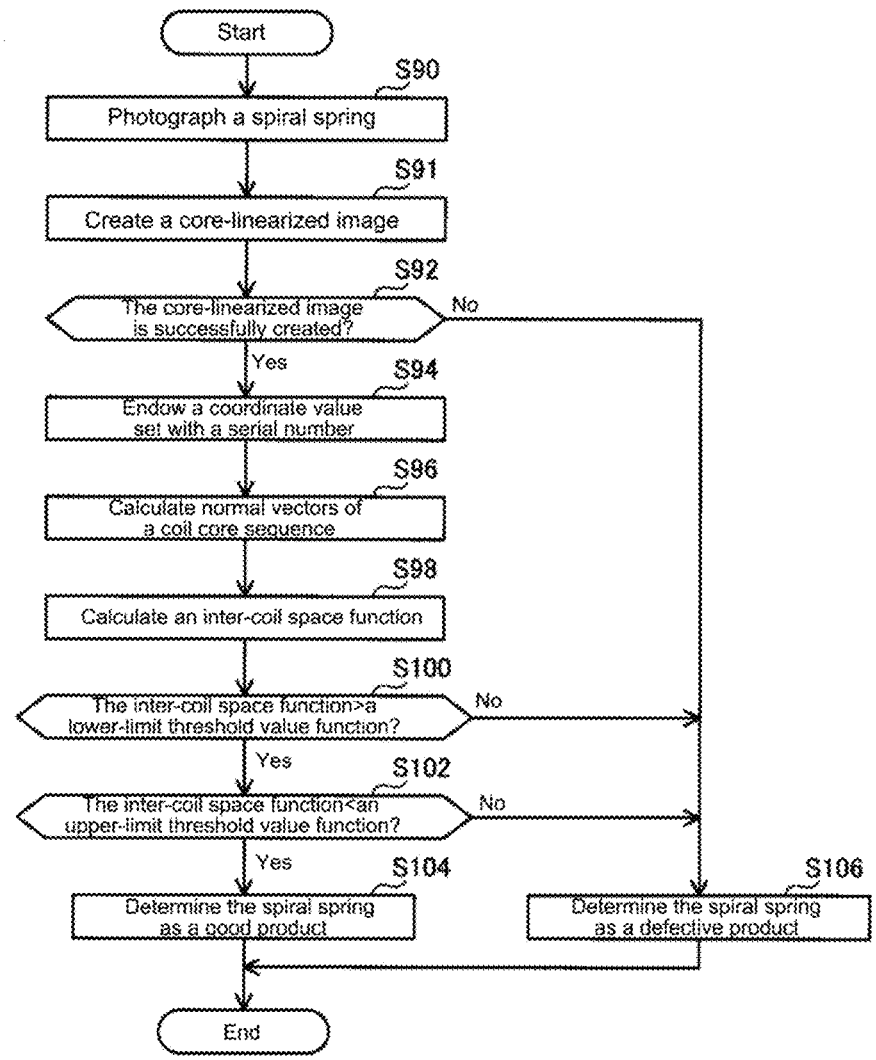
FIG. 18 is a flow chart of performing a shape measurement flow for a spiral spring using the shape measurement device in Second Example.
Figure 19:
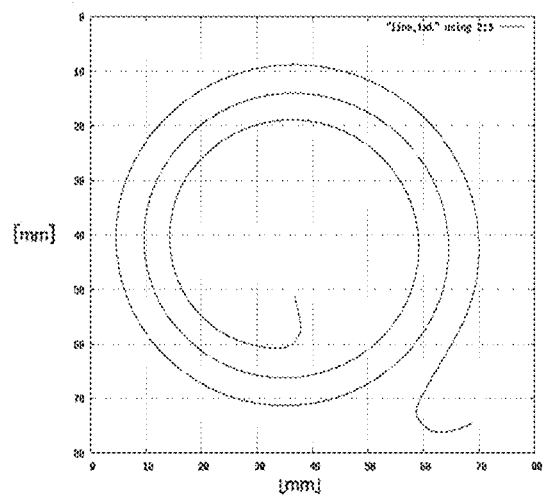
FIG. 19 is a figure showing a core-linearized image of the spiral spring of the second type.

FIG. 18 is a flow chart of performing a shape measurement flow for the spiral spring 30 using the shape measurement device of the present example. The premise in the present example is that the spiral spring 30 measured has a substantially constant coil thickness (thickness of coil). Firstly, in Step S90, the spiral spring 30 is photographed by performing the same processing as that in Step S10 (referring to FIG. 2A) in First Example. Subsequently, in Step S91, a coil core is extracted (core-linearization is performed) from the photographic image photographed in Step S90 so as to create a core-linearized image. In Step S92, whether the core-linearized image is successfully created is judged. The processing of creating the core-linearized image can be performed using a commonly known method (for example, Japanese Patent Application Laid-Open No.2013-19845). Herein, in a spiral spring with neighboring coils contacting with each other (referring to FIG. 7), the coil core is branched at the contact point Ct, and the coil core generally cannot be determined. At this time, it is judged that the core-linearized image is unsuccessfully created ("No" in Step S92), and it goes to Step S106. On the other hand, as shown in FIG. 19, when a coil core can be extracted from the inner hook 32 to the outer hook 34 of the spiral spring 30, it is judged that the core-linearized image is successfully created ("Yes" in Step S92), and it goes to Step S94. Besides, processing from this Step S91 to subsequent Step S106 is executed by the computer 22.

The coil core extracted by the processing of Step S91 is represented by a coordinate value set of pixels of the core-linearized image. In Step S94, these coordinate value sets are tracked so as to endow them serial numbers. Specifically, from a front end point of the inner hook 32 to a front end point of the outer hook 34, such serial numbers as $(x_0, y_0), (x_1, y_1) \ldots (x_{n-1}, y_{n-1})$ are endowed to the coordinate values of respective pixels sequentially. The processing also can be performed for all pixels constituting the core-linearized image, and the processing also can be performed for the pixels with equal intervals. Below, a coordinate value set endowed with the serial numbers is also referred to as a coil core sequence.

Figure 20:
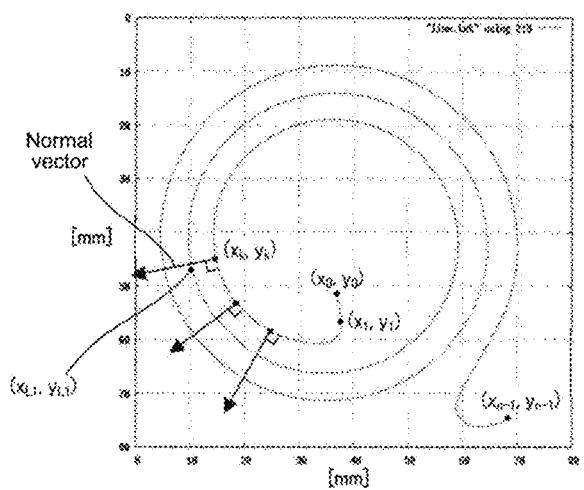
FIG. 20 is a graph showing normal vectors of a coil core sequence.

Subsequently, in Step S96, as shown in FIG. 20, normal vectors of respective coordinate values $(x_i, y_i)$ $(i=0\sim n-1)$ on the coil core sequence are calculated. For example, when a normal vector of a coordinate value $(x_k, y_k)$ is calculated, a straight-line approximation is performed for the coordinate value $(x_k, y_k)$ and coordinate value sets in its vicinity, and an outward vector orthogonal to the straight line is calculated as the normal vector of the coordinate value $(x_k, y_k)$. A starting point of the normal vector is the coordinate value $(x_k, y_k)$. Besides, "outward vector" represents a vector extending towards a direction away from a center (omitted in the figures) of the spiral spring 30.

Subsequently, in Step S98, n inter-coil spaces pip) are calculated using n normal vectors calculated in Step S96, and the inter-coil space function $\rho_1(\theta)$ is calculated on this basis. Specifically, firstly, a coordinate value $(x_{L1}, y_{L1})$ is selected, which coordinate value $(x_{L1}, y_{L1})$ is a coordinate value closest to the coordinate value $(x_k, y_k)$ in the coordinate value set constituting a coil core (i.e. a coil core neighboring a coil core containing a coordinate value $(x_k, y_k)$ on an outer peripheral side thereof) first intersecting with the normal vector of the coordinate value $(x_k, y_k)$ (referring to FIG. 20). Subsequently, a value obtained by subtracting the coil thickness d from the distance between the coordinate value $(x_k, y_k)$ and the coordinate value $(x_{L1}, y_{L1})$ is calculated as the inter-coil space $\rho_1(\theta_k)$ when i=k (that is, $\rho_1(\theta_k)=\{(x_k-x_{L1})^2+(y_k-y_{L1})^2\}^{1/2}-d$). The n inter- coil spaces $\rho_1(\theta_i)$ calculated in this way are connected to perform approximation, so as to calculate the inter-coil space function $\rho_1(\theta)$.

Subsequently, in Steps S100~S106, whether the spiral spring 30 is good or not is determined. The processing in these steps are the same as the processing (referring to FIG. 2B) in Steps S22~S28 in First Example.

According to the structure in Second Example, the same effects as those in First Example also can be obtained. Besides, in the present example, the normal vectors of respective coordinate values of the coil core sequence are calculated, thus the distance between the coil cores is calculated. Therefore, the inter-coil space (or the pitch) can be correctly calculated, and the quality inspection precision of the inter-coil space shape of the spiral spring 30 can be improved. The shape measurement method using such core-linearized image as in Second Example, for example, is applicable to uses requiring high precision such as FEM analysis during designing and so on.

Besides, in the present example, since the coil thickness d of the spiral spring 30 is substantially constant, instead of the inter-coil space $\rho_1(\theta_i)$, the pitch $\rho_3(\theta_i)$ also can be calculated, and the pitch function $\rho_3(\theta)$ is calculated on this basis. At this time, the pitch $\rho_3(\theta_k)$ when i=k is defined by a following formula: $\rho_3(\theta_k)=\{(x_k-x_{L1})^2+(y_k-y_{L1})^2\}^{1/2}$.

Besides, in the present example, the same method as Method 2 in Fifth Variant of First Example also can be used. That is, the three-dimensional data created according to the measurement data measured by the laser displacement meter 50 (referring to FIG. 13) also can be converted to a two-dimensional image, and the processing after Step S91 is performed for the two-dimensional image.

(First Variant)

Figure 21:
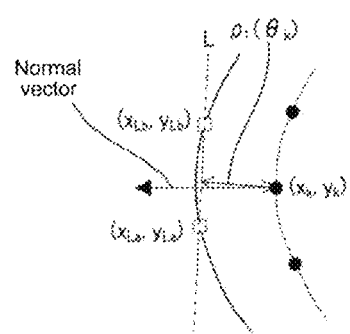
FIG. 21 is a figure showing a method for calculating a distance between coil cores of neighboring coils.

In the present variant, referring to FIG. 21, other methods for calculating the inter-coil space function $\rho_1(\theta)$ in Step S98 is described. Firstly, as shown in FIG. 21, a coordinate value $(x_{La}, y_{La})$ and a coordinate value $(x_{Lb}, y_{Lb})$ are selected, the coordinate value $(x_{La}, y_{La})$ and the coordinate value $(x_{Lb}, y_{Lb})$ are the coordinate values closest to and the coordinate values second closest to the coordinate value $(x_k, y_k)$ in the coordinate value set constituting the coil core first intersecting with the normal vector of the coordinate value $(x_k, y_k)$. Subsequently, a calculation formula for a straight line L (referring to a broken line in FIG. 21) passing through the coordinate value $(x_{La}, y_{La})$ and the coordinate value $(x_{Lb}, y_{Lb})$ is calculated. Then, a value obtained by subtracting the coil thickness d from the distance between the coordinate value $(x_k, y_k)$ and the straight line L is calculated as the inter-coil space $\rho_1(\theta_k)$ when i=k. The inter-coil space function $\rho_1(\theta)$ also can be calculated according to the n inter-coil spaces $\rho_1(\theta_i)$ calculated in this way. Besides, instead of the method for linear approximation for 2 coordinate values, interpolation is performed using a spline curve or a quadratic curve. When the interpolation is performed using a quadratic curve, apart from the above 2 coordinate values, a third closest coordinate value is further selected, and approximation is performed using the 3 coordinate values. Besides, the pitch $\rho_3(\theta_k)$ also can be calculated without subtracting the coil thickness d, so as to calculate the pitch function $\rho_3(\theta)$.

THIRD EXAMPLE

Figure 22:
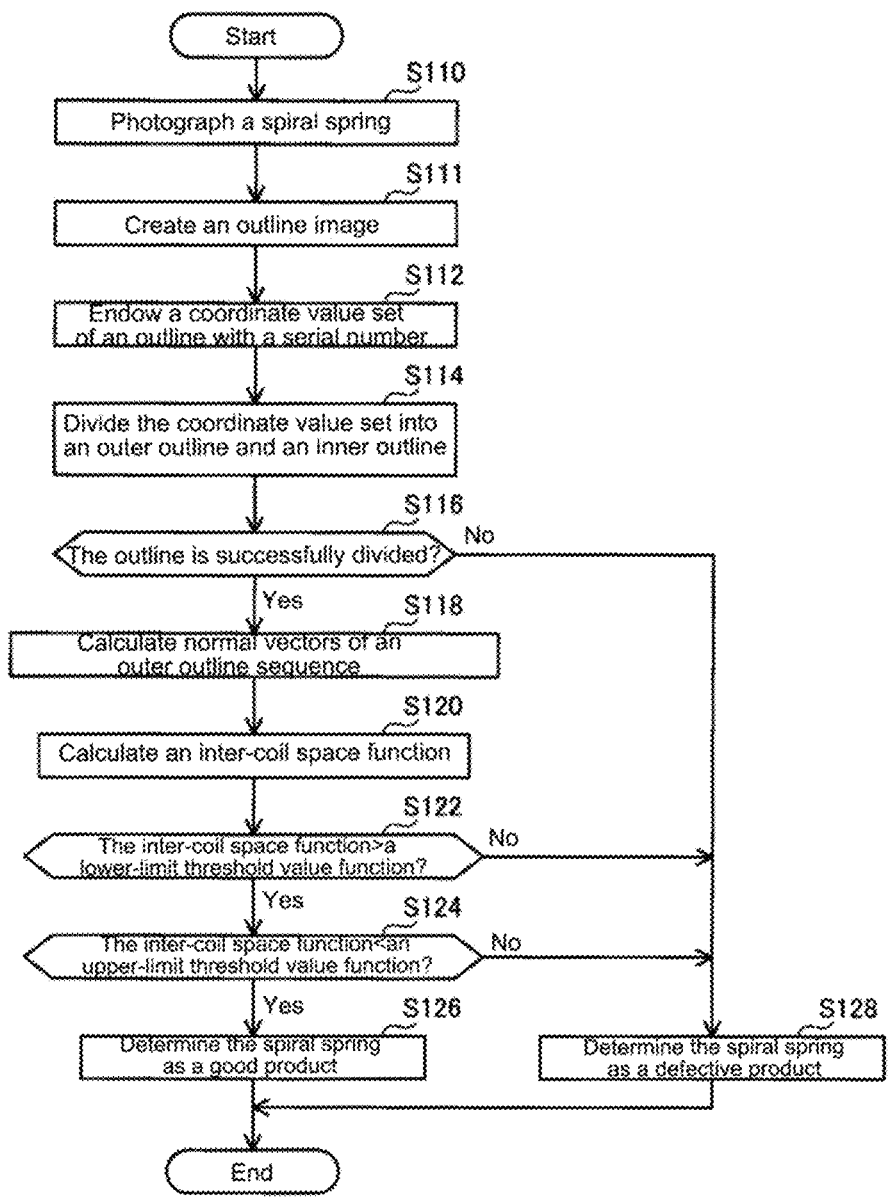
FIG. 22 is a flow chart showing a shape measurement flow performed for a spiral spring using the shape measurement device in Third Example.
Figure 23:
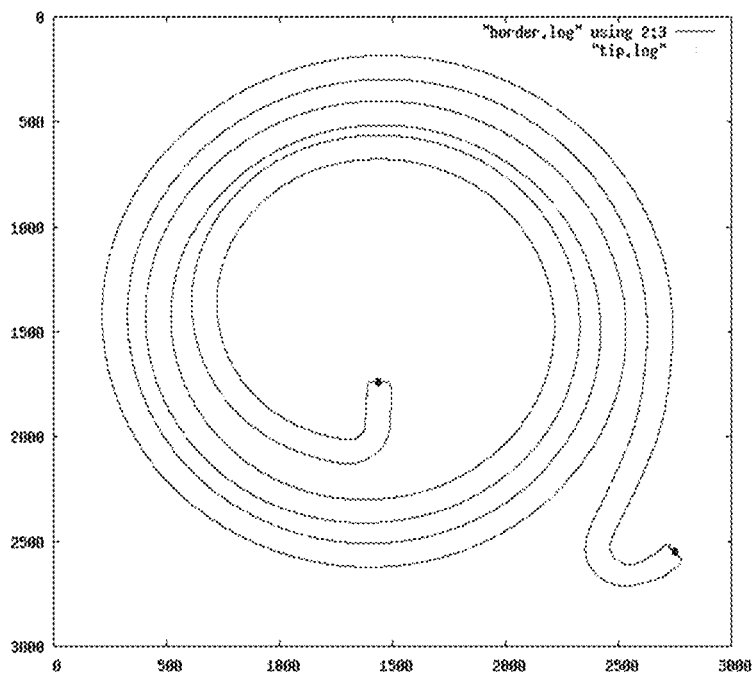
FIG. 23 is a graph showing an outline image of the spiral spring of the second type.
Figure 24:
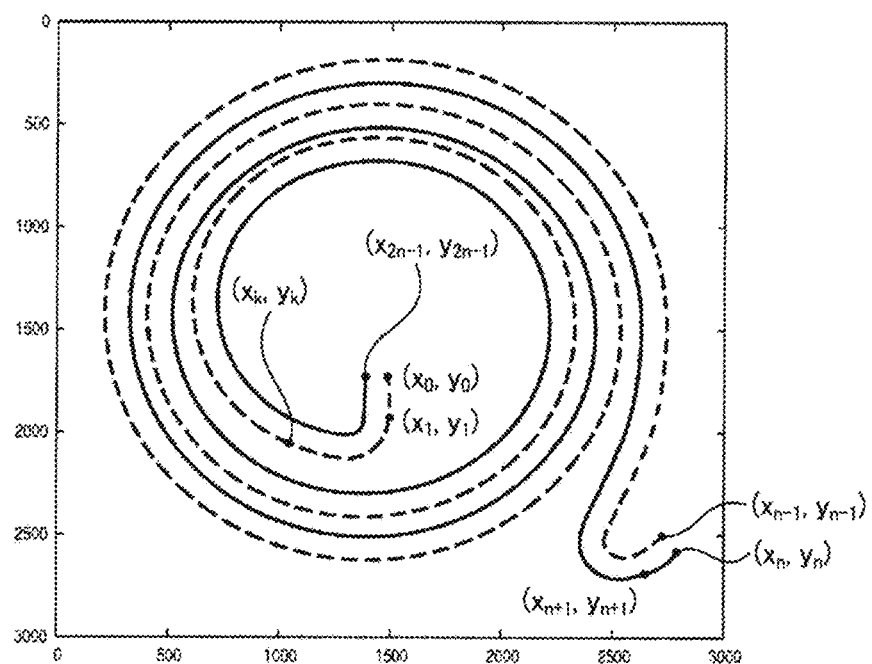
FIG. 24 is a graph showing a coordinate value set of an outer outline and a coordinate value set of an inner outline.

Subsequently, the shape measurement device in Third Example is described with reference to FIG. 22~FIG. 25. FIG. 22 is a flow chart of performing a shape measurement flow for the spiral spring 30 using the shape measurement device of the present example. Firstly, in Step S110, the spiral spring 30 is photographed by performing the same processing as that in Step S10 (referring to FIG. 2A) in First Example. Subsequently, in Step S111, no polar-coordinate conversion is performed for a photographic image photographed in Step S110, while an outline is extracted from the photographic image so as to create an outline image. The processing of creating the outline image can be carried out using a commonly known method (for example, Japanese Patent Application Laid-Open No.2009-257950 or Japanese Patent Application Laid-Open No.2013-19845). The outline extracted by the processing in Step S111 is represented by a coordinate value set of pixels of the outline image. In step S112, as shown in FIG. 24, the coordinate value set of the outline extracted by the processing in Step S111 is tracked so as to be endowed with a serial number. Specifically, in a manner of moving for one turn from an inner hook end point to an outer hook end point of the outline, such serial numbers as $(x_0, y_0), (x_1, y_1) \ldots (x_{2n-1}, y_{2n-1})$ are endowed to coordinate values of respective pixels sequentially. The processing also can be performed for all pixels constituting the outline image, and the processing also can be performed for the pixels with equal intervals. Besides, processing from this Step S111 to subsequent Step S128 is executed by the computer 22.

In Step S114, as shown in FIG. 24, these coordinate value sets endowed with the serial numbers are divided into a coordinate value set constituting the outer outline (referring to a broken line) and a coordinate value set constituting the inner outline (referring to a solid line). The processing can be performed by determining 2 inner hook end points (a corner of 2 parts consisting of a front end face and a side face of the inner hook) and 2 outer hook end points (a corner of 2 parts consisting of a front end face and a side face of the outer hook) using a commonly known method. Below, a coordinate value set constituting the outer outline endowed with the serial number is also called as an outer outline sequence. Subsequently, in Step S116, it is judged whether the coordinate value set endowed with the serial number is divided into a coordinate value set constituting the outer outline and a coordinate value set constituting the inner outline in Step S114. Herein, in a spiral spring with neighboring coils contacting with each other (referring to FIG. 7), since there is the contact point Ct, the coordinate value set constituting the outer outline and the coordinate value set constituting the inner outline cannot be divided. At this time, it is judged that the outline is unsuccessfully divided ("No" in Step S116), and it goes to Step S128. On the other hand, when the coordinate value set is already divided into the coordinate value set constituting the outer outline and the coordinate value set constituting the inner outline, it is judged that the outline is successfully divided ("Yes" in Step S116), and it goes to Step S118.

Figure 25:
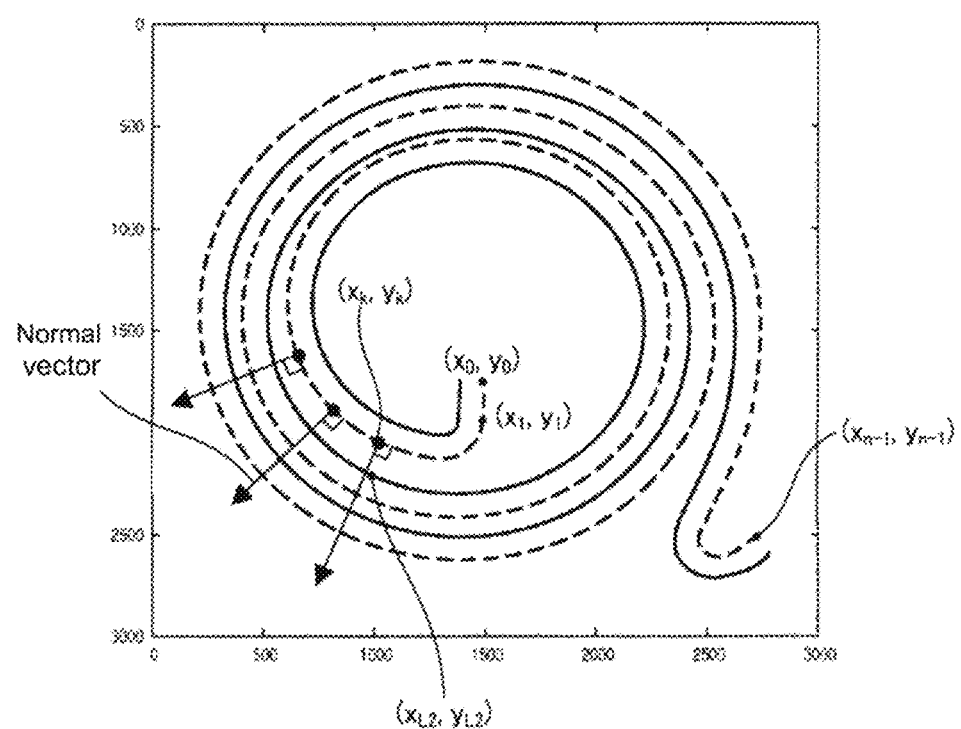
FIG. 25 is a graph showing normal vectors of an outline sequence.

Subsequently, in Step S118, as shown in FIG. 25, normal vectors of respective coordinate values $(x_i, y_i)$ (i=0~n−1) on the outline sequence are calculated. The processing is the same as the processing in Step S96 in Second Example.

Subsequently, in Step S120, n inter-coil spaces $\rho_1(\theta_1)$ are calculated using n normal vectors calculated in Step S118, and the inter-coil space function $\rho_1(\theta)$ is calculated on this basis. Specifically, firstly, a coordinate value $(x_{L2}, y_{L2})$ is selected, which coordinate value $(x_{L2}, y_{L2})$ is a coordinate value closest to the coordinate value $(x_k, y_k)$ in the coordinate value set constituting an inner outline (i.e. an inner outline neighboring an outer outline containing coordinate values $(x_k, y_k)$ on an outer peripheral side thereof) first intersecting with the normal vector of the coordinate value $(x_k, y_k)$ (referring to FIG. 25). The distance between the coordinate value $(x_k, y_k)$ and the coordinate value $(x_{L2}, y_{L2})$ is calculated as the inter-coil space $\rho_1(\theta_k)$ when i=k (that is, $\rho_1(\theta_k) = \{(x_k-x_{L2})^2+(y_k-y_{L2})^2\}^{1/2}$). The n inter-coil spaces $\rho_1(\theta_i)$ calculated in this way are connected to perform approximation, so as to calculate the inter-coil space function $\rho_1(\theta)$.

Subsequently, in Steps S122~S128, whether the spiral spring 30 is good or not is determined. The processing in these steps are the same as the processing (referring to FIG. 2B) in Steps S22~S28 in First Example.

The same effect as those in First Example also can be obtained according to the structure in Third Example.

Besides, likewise in the present example, in Step S120, the inter-coil space function $\rho_1(\theta)$ can be calculated using the same method as that in First Variant of Second Example.

(First Variant)

Figure 26:
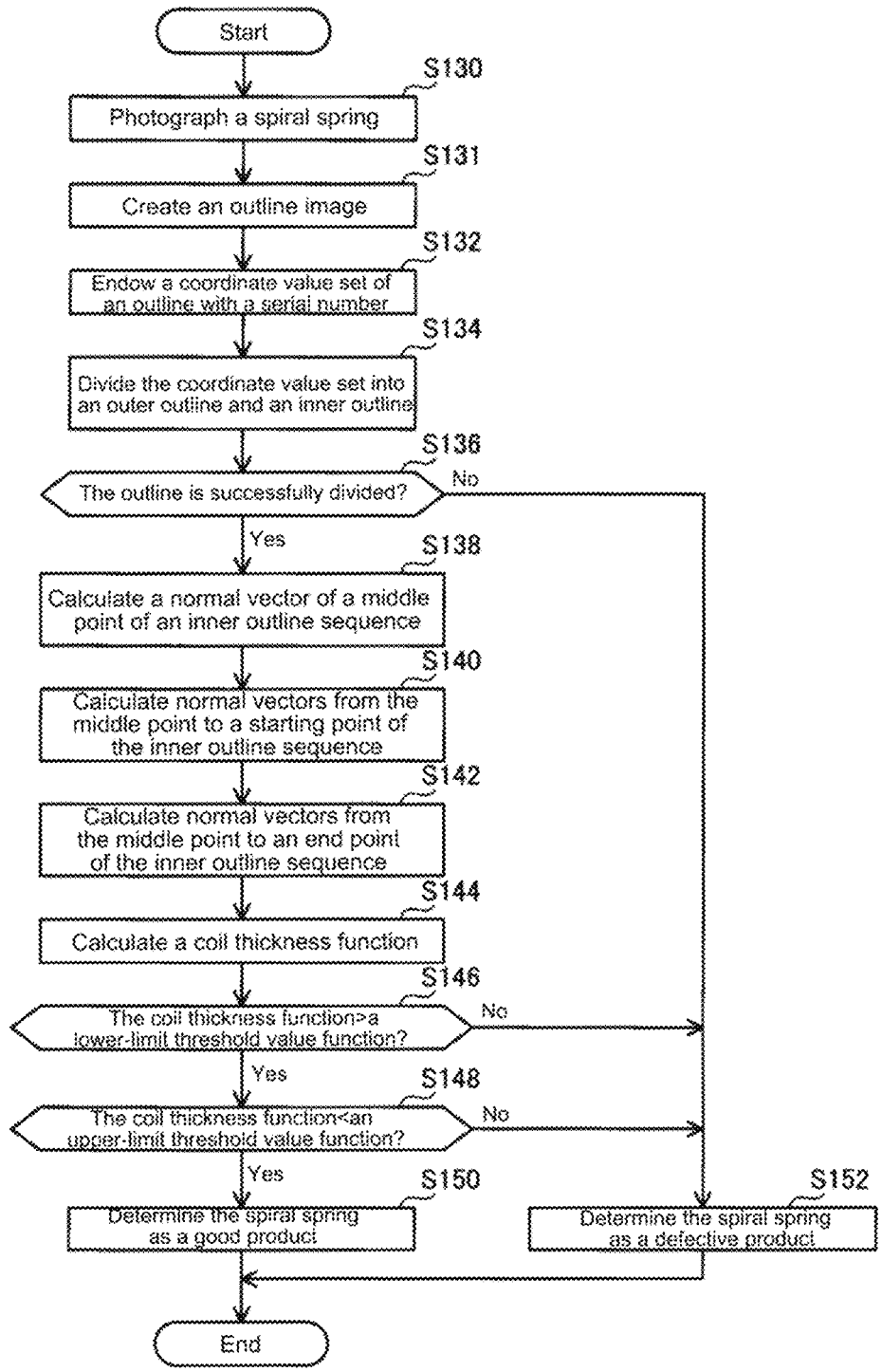
FIG. 26 is a flow chart of performing a shape measurement flow for a spiral spring using the shape measurement device in First Variant of Third Example.
Figure 28:
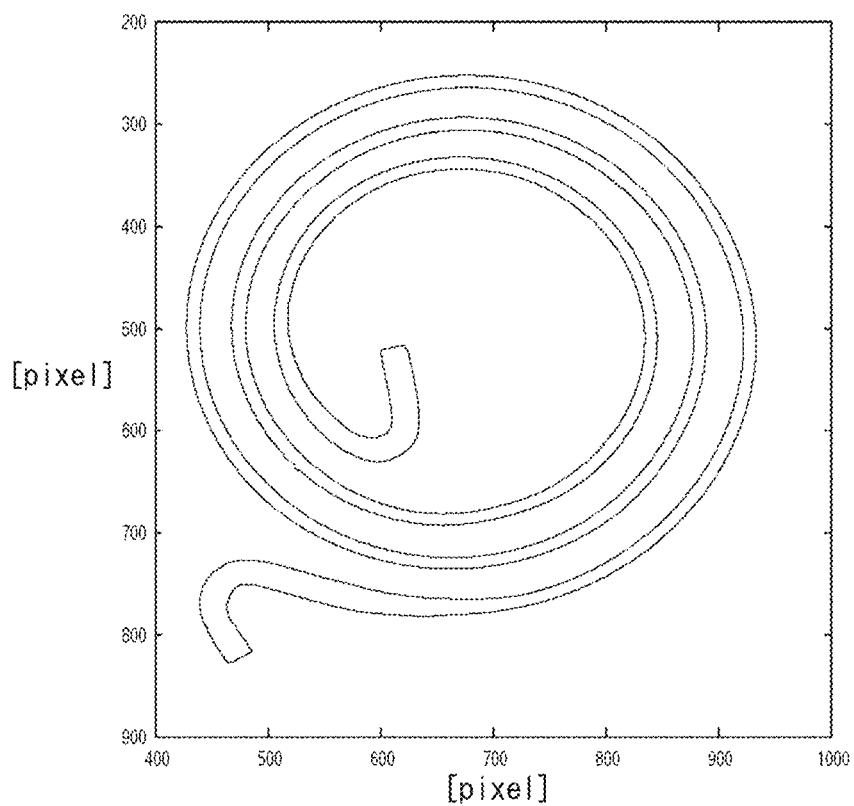
FIG. 28 is a graph showing an outline image of the spiral spring in FIG. 27.
Figure 29:
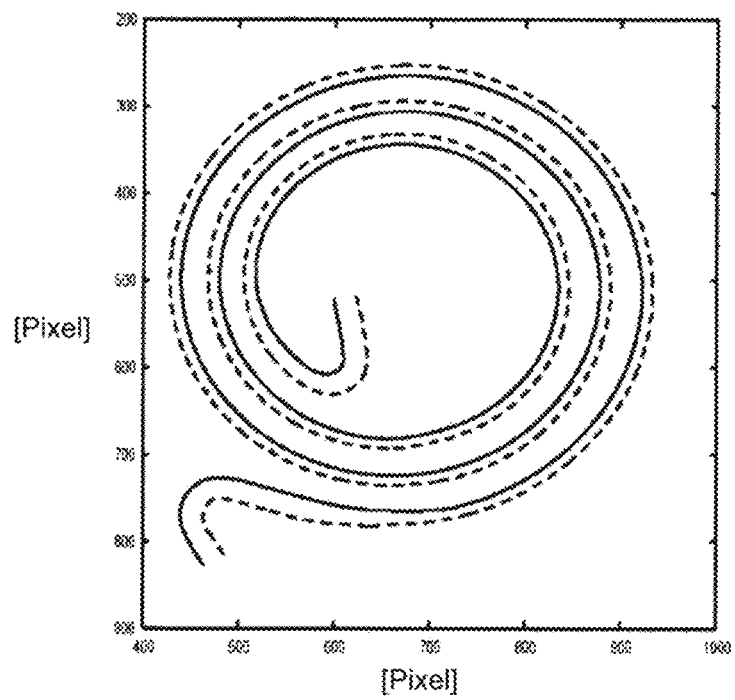
FIG. 29 is a graph showing a coordinate value set of an outer outline and a coordinate value set of an inner outline.

In the present variant, referring to FIG. 26~FIG. 31, a method for calculating the coil thickness function $\rho_2(\theta)$, instead of the inter-coil space function $\rho_1(\theta)$ is described. FIG. 26 is a flow chart showing a shape measurement flow performed for the spiral spring 30 using the shape measurement device of the present variant. The processing in Step S130~Step S136 in FIG. 26 are the same as the processing in Step S110~Step S116 in Third Example. FIG. 27 shows a photographic image of the spiral spring 30 photographed in Step S130. It can be seen from FIG. 27 that the coil thickness of the spiral spring 30 as a measurement object in the present example is not constant. FIG. 28 shows an outline image created in Step S131, and FIG. 29 shows a coordinate value set (referring to a broken line) of an outer outline and a coordinate value set (referring to a solid line) of an inner outline in cases where the outline is successfully divided in Step S136 ("Yes" in Step S136). Below, the coordinate value set constituting the inner outline endowed with the serial number is specifically referred to as an inner outline sequence.

Figure 30:
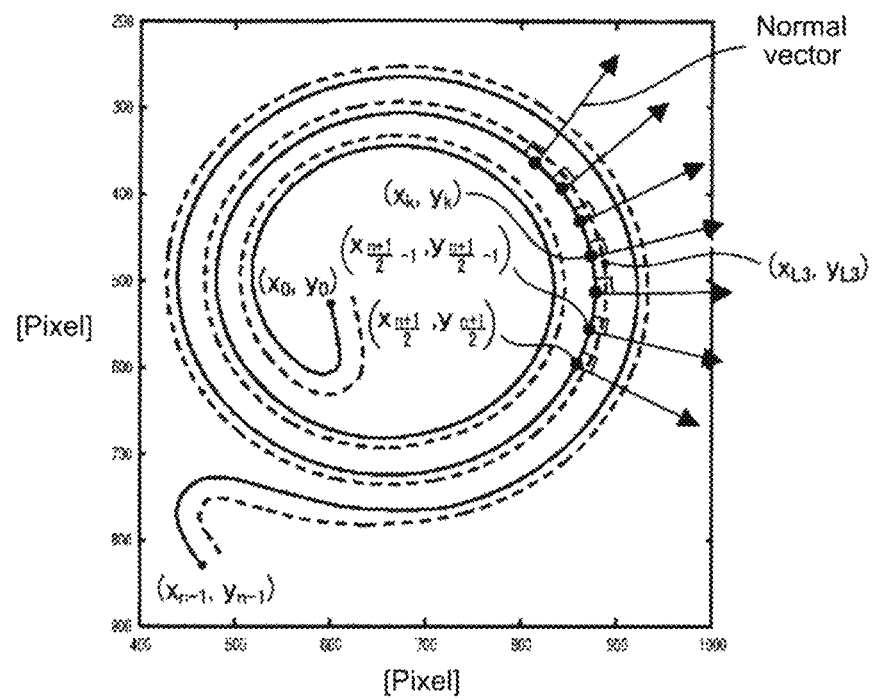
FIG. 30 is a graph showing normal vectors of an outline sequence from a next point of an inner side of a middle point to a starting point.

Subsequently, in Step S138, as shown in FIG. 30, normal vectors of middle coordinate values of the inner outline sequence are calculated. A method for calculating the normal vectors is the same as Step S118 in Third Example. That is, the normal vectors calculated in Step S138 are outward vectors (vectors extending towards a direction away from a center of the spiral spring 30).

Subsequently, in Step S140, as shown in FIG. 30, normal vectors of respective coordinate values $(x_i, y_i)$ (i=(n+1)/2−1~0) from a coordinate $(x_{(n+1)/2-1}, y_{(n+1)/2-1})$ neighboring the middle coordinate $(x_{(n+1)/2}, y_{(n+1)/2})$ to a starting point of the inner outline sequence are calculated. Besides, among the normal vectors with the coordinate value $(x_i, y_i)$ as a starting point, there are 2 types of normal vectors, namely, "outward normal vectors" and "inward normal vectors (i.e. vectors extending towards a direction approaching the center of the spiral spring 30)". In this step, "a normal vector having a relatively small angle relative to a normal vector calculated using a previous coordinate value" from the two types of normal vectors is selected.

Figure 31:
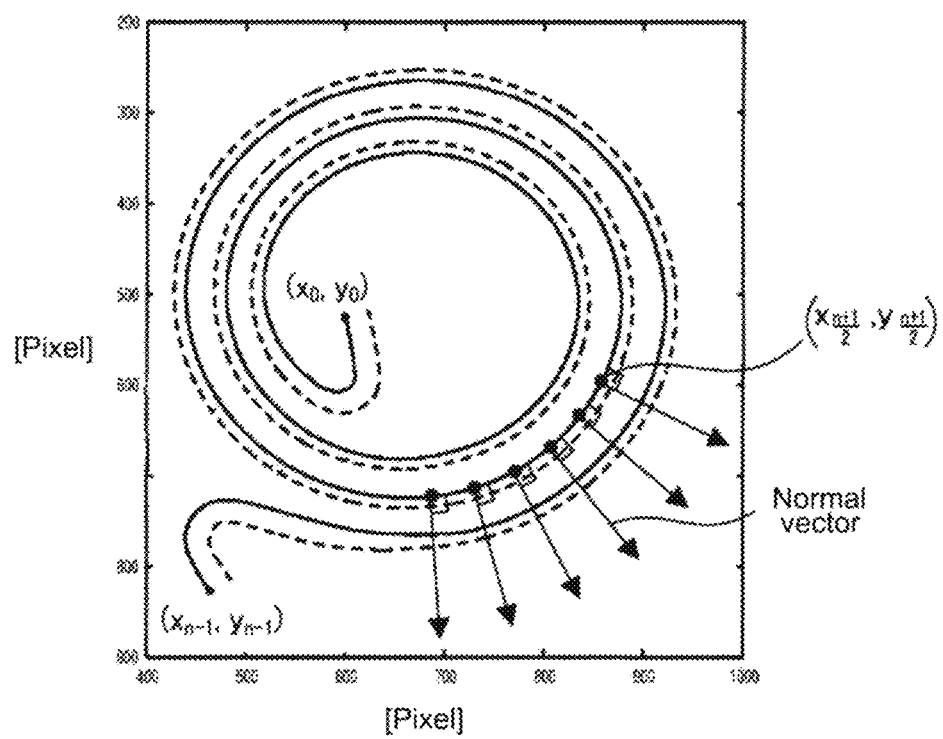
FIG. 31 is a graph showing normal vectors of an outline sequence from a next point of an outer side of a middle point to an end point.

Subsequently, in Step S142, as shown in FIG. 31, normal vectors of respective coordinate values $(x_i, y_i)$ (i=(n+1)/2+1~n−1) from a neighboring coordinate value on a peripheral side of the middle coordinate value of the inner outline sequence to an end point are calculated. In this step, likewise in Step S140, "a normal vector having a relatively small angle relative to a normal vector calculated using a previous coordinate value" is selected.

Subsequently, in Step S144, n coil thicknesses $\rho_2(\theta_i)$ are calculated using n normal vectors calculated in Steps S138~S142, and the coil thickness function $\rho_2(\theta)$ is calculated on this basis. Specifically, firstly, a coordinate value $(x_{L3}, y_{L3})$ is selected, which coordinate value $(x_{L3}, y_{L3})$ is a coordinate value closest to the coordinate value $(x_k, y_k)$ in the coordinate value set constituting an outer outline (i.e. an outer outline neighboring an inner outline containing coordinate values $(x_k, y_k)$ on an outer peripheral side thereof) first intersecting with the normal vector of the coordinate value $(x_k, y_k)$ (referring to FIG. 30). The distance between the coordinate value $(x_k, y_k)$ and the coordinate value $(x_{L3}, y_{L3})$ is calculated as the coil thickness $\rho_2(\theta_k)$ when i=k (that is, $\rho_2(\theta_k) = \{(x_k - x_{L3})^2 + (y_k - y_{L3})^2\}^{1/2}$). The thicknesses $\rho_2(\theta_i)$ of the n coils, calculated in this way, are connected to perform approximation, so as to calculate the coil thickness function $\rho_2(\theta)$. The processing in Steps S146~S152 are the same as the processing in Steps SS22~S28 in First Example.

Besides, likewise in the present variant, in Step S144, the coil thickness function $\rho_2(\theta)$ can be calculated using the same method as that in First Variant of Second Example.

Besides, the same method as Method 2 in Fifth Variant of First Example also can be used in Third Example and First Variant thereof. That is, the three-dimensional data created according to the measurement data measured by the laser displacement meter 50 (referring to FIG. 13) also can be converted to a two-dimensional image, and the processing after Step S111 or the processing after Step S132 also can be performed for the two-dimensional image.

The above-mentioned are detailed description of specific examples of the present disclosure, but these are merely illustration by examples, and shall not be construed as limiting the claims. In the technology defined in the claims, various modifications and alterations to the examples illustrated above are included.

For example, in the above examples, as the origin point for performing the polar-coordinate conversion, the center of gravity G of the spiral spring 30 is used, while the present disclosure is not limited to such embodiment. For example, the origin point for performing the polar-coordinate conversion also may be not set inside the spiral spring 30, but set outside of the spiral spring 30.

Besides, technical elements described in the present description or the accompanying drawings exert the technological applicability independently or in various combinations, without being limited to the combinations defined in the claims of the present disclosure. Besides, the technologies illustrated in the present description or the accompanying drawings simultaneously achieve multiple objects, and they have the technological applicability of their own by achieving one of the objects.

What is claimed is:

1. A shape measurement device, for measuring a shape of a spiral spring formed in a spiral shape, comprising:
   a computer; and
   a memory stored therein with a computer program which, when being executed, causes the computer to:
   input a captured photographic image depicting the spiral spring or measurement data produced by measuring shape of the spiral spring;
   create a polar-coordinate image obtained by performing polar-coordinate conversion on the input photographic image or measurement data, calculate an outer edge function $e_o(\theta)$ by tracking a boundary of an outer side of the coil of the polar-coordinate image, and calculate an inner edge function $e_i(\theta)$ by tracking a boundary of an inner side of the coil of the polar-coordinate image,
   calculate at least one of an inter-coil space function and a coil thickness function on the basis of a difference between the outer edge function $e_o(\theta)$ and the inner edge function $e_i(\theta)$, wherein the inter-coil space function represents a space between neighboring coils of the spiral spring, and the coil thickness function represents a thickness of the coil of the spiral spring; and
   quantitatively evaluate the shape of the spiral spring as a measurement object, and/or determine whether the spiral spring as the measurement object is good or not, by using the at least one of the calculated inter-coil space function and coil thickness function, and using at least one of a stored reference function and a stored reference parameter which are specified in advance.

2. The shape measurement device of claim 1, wherein the computer program, when being executed, further causes the computer to:
   end, when the boundary of the outer side and the boundary of the inner side of the coil of the polar-coordinate image contact with each other, tracking in a location where the contact is.

3. The shape measurement device of claim 1, further comprising wherein the computer program, when being executed, further causes the computer to:
   create a core-linearized image obtained by core-linearizing the input photographic image or measurement data; and calculate at least one of the inter-coil space function and a pitch function on the basis of a distance between neighboring coil cores, wherein the pitch function represents a distance between coil cores of neighboring coils of the spiral spring;

wherein the quantitatively evaluation of the shape of the spiral spring as a measurement object, and/or the determination of whether the spiral spring as the measurement object is good or not, is performed by further using the calculated pitch function, and using at least one of a stored reference function and a stored reference parameter which are specified in advance.

4. The shape measurement device of claim 3, wherein the computer program, when being executed, further causes the computer to:

represent the coil core by a coordinate value set of pixels of the core-linearized image, and calculate a distance between a first coil core and a second coil core using a first coordinate value and a second coordinate value, the second coil core is a coil core on an outer peripheral side of the first coil core and neighboring the first coil core, the first coordinate value is a coordinate value contained in a coordinate value set constituting the first coil core, and the second coordinate value is a coordinate value at least closest to the first coordinate value, with the second coordinate value contained in a coordinate value set constituting the second coil core.

5. The shape measurement device of claim 1, wherein the computer program, when being executed, further causes the computer to:

store at least one of a lower-limit threshold value function representing a lower limit value of the inter-coil space and an upper-limit threshold value function representing an upper limit value of the inter-coil space, and determine the spiral spring as a measurement object to be defective when the inter-coil space function is lower than the lower-limit threshold value function or higher than the upper-limit threshold value function.

6. A shape measurement device, for measuring a shape of a spiral spring formed in a spiral shape, comprising:

a computer; and a memory stored therein with a computer program which, when being executed, causes the computer to:

input a captured photographic image depicting the spiral spring or measurement data produced by measuring shape of the spiral spring;

create an outline image formed by extracting an outline from the input photographic image or measurement data in a state that no polar-coordinate conversion is performed;

divide the outline of the outline image into an outer outline of an outer peripheral side and an inner outline of an inner peripheral side of the coil, and calculate at least one of an inter-coil space function and a coil thickness function on the basis of a distance between neighboring outer outline and inner outline, wherein the inter-coil space function represents a space between neighboring coils of the spiral spring, and the coil thickness function represents a thickness of the coil of the spiral spring; and quantitatively evaluate the shape of the spiral spring as a measurement object, and/or determine whether the spiral spring as the measurement object is good or not, by using the at least one of the calculated inter-coil space function and coil thickness function, and using at least one of a stored reference function and a stored reference parameter which are specified in advance.

7. The shape measurement device of claim 6, wherein the computer program, when being executed, further causes the computer to:

represent the outer outline and the inner outline of the coil by a coordinate value set of pixels of the outline image, and calculate a distance between an outer outline and an inner outline neighboring the outer outline on an outer peripheral side of the outer outline using a third coordinate value and a fourth coordinate value, and calculate the inter-coil space function on the basis of the distance, the third coordinate value is a coordinate value contained in the coordinate value set constituting the outer outline, and the fourth coordinate value is a coordinate value at least closest to the third coordinate value, with the fourth coordinate value contained in the coordinate value set constituting the inner outline.

8. The shape measurement device of claim 7, wherein the computer program, when being executed, further causes the computer to:

calculate a distance between an inner outline and an outer outline neighboring the inner outline on an outer peripheral side of the inner outline using a fifth coordinate value and a sixth coordinate value, and calculate the coil thickness function on the basis of the distance, the fifth coordinate value is a coordinate value contained in the coordinate value set constituting the inner outline, and the sixth coordinate value is a coordinate value at least closest to the fifth coordinate value, with the sixth coordinate value contained in the coordinate value set constituting the outer outline.

9. A computer-implemented shape measurement method, measuring a shape of a spiral spring formed in a spiral shape, wherein the method comprises:

acquiring a photographic image obtained by photographing the spiral spring or measurement data produced by measuring the shape of the spiral spring, creating a polar-coordinate image obtained by performing polar-coordinate conversion on the input photographic image or measurement data, calculating an outer edge function $e_o(\theta)$ by tracking a boundary of an outer side of the coil of the polar-coordinate image, and calculating an inner edge function $e_i(\theta)$ by tracking a boundary of an inner side of the coil of the polar-coordinate image, and calculating at least one of an inter-coil space function and a coil thickness function on the basis of a difference between the outer edge function $e_o(\theta)$ and the inner edge function $e_i(\theta)$, wherein the inter-coil space function represents a space between neighboring coils of the spiral spring, and the coil thickness function represents thickness of the coil of the spiral spring; and quantitatively evaluating the shape of the spiral spring as a measurement object, and/or determining whether the spiral spring as the measurement object is good or not, by using the at least one of the calculated inter-coil space function and coil thickness function, and using at least one of a stored reference function and a stored reference parameter which are specified in advance.

* * * * *